US009718217B2

(12) United States Patent
Yusa et al.

(10) Patent No.: US 9,718,217 B2
(45) Date of Patent: *Aug. 1, 2017

(54) KNEADING APPARATUS, METHOD FOR PRODUCING THERMOPLASTIC RESIN MOLDED PRODUCT, AND FOAM INJECTION MOLDING METHOD

(71) Applicant: HITACHI MAXELL, LTD., Ibaraki-shi, Osaka (JP)

(72) Inventors: Atsushi Yusa, Nagaokakyo (JP); Satoshi Yamamoto, Settsu (JP); Tetsuya Ano, Takatsuki (JP); Hironori Ota, Ibaraki (JP)

(73) Assignee: HITACHI MAXELL, LTD., Ibaraki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/885,376

(22) Filed: Oct. 16, 2015

(65) Prior Publication Data

US 2016/0039116 A1 Feb. 11, 2016

Related U.S. Application Data

(60) Continuation of application No. 14/572,389, filed on Dec. 16, 2014, now Pat. No. 9,186,634, which is a
(Continued)

(30) Foreign Application Priority Data

Aug. 19, 2011 (JP) .................... 2011-179935
Sep. 7, 2011 (JP) .................... 2011-195328

(51) Int. Cl.
*B29C 35/00* (2006.01)
*B29B 7/80* (2006.01)
(Continued)

(52) U.S. Cl.
CPC .......... *B29B 7/801* (2013.01); *B01F 7/00416* (2013.01); *B01F 15/00357* (2013.01);
(Continued)

(58) Field of Classification Search
CPC ....... B29B 7/801; B29B 7/42; B01F 7/00416; B01F 15/00357; B29C 44/02; B29C 44/3442; B29C 45/1816; B29C 45/52
See application file for complete search history.

(56) References Cited

U.S. PATENT DOCUMENTS 5,997,781 A    12/1999   Nishikawa et al.
6,328,916 B1   12/2001   Nishikawa et al.
(Continued)

FOREIGN PATENT DOCUMENTS

EP    1 293 319 A1    3/2003
JP    S46-666         1/1971
(Continued)

OTHER PUBLICATIONS

Dec. 15, 2015 Office Action issued in Japanese Patent Application No. 2013-047805.
(Continued)

*Primary Examiner* — Joseph S Del Sole
*Assistant Examiner* — John Robitaille
(74) *Attorney, Agent, or Firm* — Oliff PLC

(57) ABSTRACT

A kneading apparatus for a thermoplastic resin, includes: a plasticizing cylinder which has a high pressure kneading zone and a pressure reduction zone; a screw in the plasticizing cylinder; a downstream side seal mechanism which shuts off communication between the high pressure kneading zone and the pressure reduction zone; and a pressure reduction zone pressure adjusting mechanism which is connected to the pressure reduction zone and which controls a pressure of the pressure reduction zone so that the pressure
(Continued)

is not less than an atmospheric pressure and the pressure is not more than a maximum pressure of the high pressure kneading zone that is achieved when kneading a molten resin with a pressurized fluid, when the downstream side seal mechanism shuts off the communication between the high pressure kneading zone and the pressure reduction zone.

8 Claims, 12 Drawing Sheets

Related U.S. Application Data division of application No. 13/926,482, filed on Jun. 25, 2013, now Pat. No. 8,980,147, which is a continuation of application No. PCT/JP2012/070559, filed on Aug. 10, 2012.

(51) Int. Cl.
| | |
|---|---|
| B29B 7/88 | (2006.01) |
| B29C 44/02 | (2006.01) |
| B29C 44/34 | (2006.01) |
| B29C 47/00 | (2006.01) |
| B29C 47/10 | (2006.01) |
| B29C 47/40 | (2006.01) |
| B29C 47/82 | (2006.01) |
| B29C 47/92 | (2006.01) |
| B29B 7/42 | (2006.01) |
| B29C 47/38 | (2006.01) |
| B29C 47/60 | (2006.01) |
| B29C 45/18 | (2006.01) |
| B29C 45/52 | (2006.01) |
| B01F 7/00 | (2006.01) |
| B01F 15/00 | (2006.01) |
| B29C 47/80 | (2006.01) |
| B29C 47/08 | (2006.01) |
| B29C 45/17 | (2006.01) |
| B29C 45/60 | (2006.01) |
| B29C 45/00 | (2006.01) |

(52) U.S. Cl.
CPC ............. *B29B 7/42* (2013.01); *B29B 7/88* (2013.01); *B29C 44/02* (2013.01); *B29C 44/3442* (2013.01); *B29C 45/1816* (2013.01); *B29C 45/52* (2013.01); *B29C 47/0042* (2013.01); *B29C 47/0801* (2013.01); *B29C 47/0805* (2013.01); *B29C 47/1009* (2013.01); *B29C 47/1072* (2013.01); *B29C 47/1081* (2013.01); *B29C 47/385* (2013.01); *B29C 47/40* (2013.01); *B29C 47/6018* (2013.01); *B29C 47/6075* (2013.01); *B29C 47/6093* (2013.01); *B29C 47/802* (2013.01); *B29C 47/82* (2013.01); *B29C 47/822* (2013.01); *B29C 47/825* (2013.01); *B29C 47/827* (2013.01); *B29C 47/92* (2013.01); *B01F 2215/0049* (2013.01); *B29C 47/0808* (2013.01); *B29C 47/0825* (2013.01); *B29C 2045/0079* (2013.01); *B29C 2045/1722* (2013.01); *B29C 2045/605* (2013.01); *B29C 2947/92514* (2013.01); *B29C 2947/92704* (2013.01)

(56) References Cited

U.S. PATENT DOCUMENTS

| | | |
|---|---|---|
| 2002/0060378 A1 | 5/2002 | Miyamoto et al. |
| 2003/0228485 A1 | 12/2003 | Yusa et al. |
| 2004/0253335 A1 | 12/2004 | Anderson et al. |
| 2011/0104380 A1 | 5/2011 | Yusa et al. |

FOREIGN PATENT DOCUMENTS

| | | |
|---|---|---|
| JP | H62-19423 A | 1/1987 |
| JP | 2625576 B2 | 7/1997 |
| JP | H11-292921 A | 10/1999 |
| JP | 2000-084968 A | 3/2000 |
| JP | 2003-094477 A | 4/2003 |
| JP | 2003-191272 A | 7/2003 |
| JP | 2003-305757 A | 10/2003 |
| JP | 2004-167777 A | 6/2004 |
| JP | 2005-001388 A | 1/2005 |
| JP | 3788750 B2 | 6/2006 |
| JP | 3964447 B2 | 8/2007 |
| JP | 2007-301828 A | 11/2007 |
| JP | 4092364 B1 | 5/2008 |
| JP | 4144916 B2 | 9/2008 |
| JP | 2009-298838 A | 12/2009 |
| WO | 92/17533 A1 | 10/1992 |

OTHER PUBLICATIONS

Jan. 26, 2015 Extended European Search Report issued in European Application No. 12825434.9.
Kimura et al. "Reactive Blending Under Supercritical Carbon Dioxide". Proceedings of the 17th JSPP Symposium of Japan Society of Polymer Processing, 2009, pp. 227-228.
Nov. 13, 2012 International Search Report issued in International Application No. PCT/JP2012/070559.
Feb. 25, 2014 International Preliminary Report on Patentability issued in International Application No. PCT/JP2012/070559.
Nov. 1, 2016 Office Action issued in Japanese Patent Application No. 2016-022613.

KNEADING APPARATUS, METHOD FOR PRODUCING THERMOPLASTIC RESIN MOLDED PRODUCT, AND FOAM INJECTION MOLDING METHOD

CROSS REFERENCE TO RELATED APPLICATION

This application is a Continuation application of U.S. patent application Ser. No. 14/572,389, filed Dec. 16, 2014, which is a Divisional application of U.S. patent application Ser. No. 13/926,482, which is a Continuation application of International Application No. PCT/JP2012/070559 filed on Aug. 10, 2012, and which claims the benefit of foreign priority to Japanese Patent Application No. 2011-179935 filed on Aug. 19, 2011 and Japanese Patent Application No. 2011-195328 filed on Sep. 7, 2011. The disclosures of which are incorporated herein by reference in their entirety.

BACKGROUND OF THE INVENTION

Field of the Invention

The present teaching relates to a kneading apparatus for producing a thermoplastic resin molded product by using a pressurized fluid, a method for producing the thermoplastic resin molded product based on the use of the kneading apparatus, and a foam injection molding method.

Description of the Related Art

In recent years, various types of injection molding methods and extrusion molding methods have been investigated, in which any pressurized fluid is used. Examples of the pressurized fluid include pressurized carbon dioxide and pressurized nitrogen. In the case of the molding method as described above, a fluid having an extremely high pressure is introduced into a molten resin, and hence it is possible to produce molded products having various functions. For example, in order to mutually compatibly dissolve polymers which are incompatible with each other, an injection molding method and an extrusion molding method are suggested for a polymer alloy, wherein molten resins and high pressure carbon dioxide are brought in contact and kneaded with each other in a plasticizing cylinder (Japanese Patent Application Laid-open No. 2003-94477 and Proceedings of 17th JSPP Symposium of Japan Society of Polymer Processing, 227 (2009)). In the molding methods as described above, the molten resin and pressurized carbon dioxide are brought in contact and kneaded with each other by means of a kneading apparatus which is provided with a screw contained in a plasticizing cylinder.

On the other hand, a molding method is suggested, wherein supercritical carbon dioxide is introduced into a molten resin at an intermediate position of an extrusion machine having a vent portion in order to remove any hardly volatile component from the thermoplastic resin (Japanese Patent Application Laid-open No. 11-292921). Further, an injection molding method is suggested, wherein a molten resin of thermoplastic resin is injected and charged into a mold from a plasticizing cylinder, and then a pressurized fluid, which contains supercritical carbon dioxide and a functional material such as an organic metal complex or the like, is introduced into the mold to thereby produce a thermoplastic resin molded product including the functional material dispersed on a surface (Japanese Patent No. 3964447 which corresponds to US2003/228485).

In the meantime, the solubility of pressurized carbon dioxide with respect to the resin is low. Therefore, in the case of the molding method including the step of bringing the molten resin and the pressurized carbon dioxide in contact with each other as described above, it is difficult to allow a large amount of pressurized carbon dioxide and the molten resin to be brought in contact and kneaded with each other. Therefore, when the functional material is used together with pressurized carbon dioxide, it is also difficult to introduce the functional material into the molten resin at a high concentration. From such a viewpoint, a method for producing a molded product is suggested, wherein an kneading apparatus, in which an introducing port for introducing pressurized carbon dioxide is provided on an upper side surface of a plasticizing cylinder and a vent is provided on the downstream side from the introducing port, is used so that a molten resin, pressurized carbon dioxide, and a functional material are brought in contact and kneaded with each other in the plasticizing cylinder, and then the resin internal pressure of the molten resin is lowered before being injected and charged into a mold to separate only gasified carbon dioxide from the molten resin and discharge carbon dioxide from the vent (Japanese Patent Application Laid-open No. 2009-298838 which corresponds to US2011/104380). According to this molding method, it is possible to improve the concentration of the functional material to be introduced into the molten resin, while controlling the concentration of pressurized carbon dioxide in the molten resin.

Further, in recent years, a foam injection molding method, which is based on the use of a physical foaming agent such as nitrogen and carbon dioxide in a supercritical state as the pressurized fluid, is researched and practically used (Japanese Patent No. 2625576 which corresponds to WO92/17533, Japanese Patent No. 3788750 and Japanese Patent No. 4144916 which corresponds to U.S. Pat. No. 5,997,781). According to Patent Documents 5 to 7, the physical foaming agent is introduced into a hermetically closed plasticizing cylinder, and the physical foaming agent is brought in contact with and dispersed in the plasticized and melted resin. The molten resin, in which the foaming agent is dispersed, is weighed while maintaining the high pressure in the plasticizing cylinder to such an extent that the physical foaming agent is in the supercritical state, and the molten resin is injected and charged into a mold. The supercritical fluid, which has been compatibly dissolved in the molten resin upon the injection and charging, is subjected to sudden pressure reduction and gasified. The molten resin is solidified, and thus foams (bubbles) are formed at the inside of the molded product.

The foam injection molding, which uses the supercritical fluid, is advantageous in that the process is clean, any residue of the foaming agent does not remain, and the mechanical strength of the molded product is hardly lowered because the foamed cell diameters become fine and minute, as compared with the foam injection molding which uses any chemical foaming agent. Further, the high pressure physical foaming agent functions as a plasticizer for the molten resin. Therefore, the following advantages are also provided. That is, the viscosity of the resin is lowered upon the injection and charging, and the fluidity is improved. Sink marks are suppressed, which would be otherwise caused by the shrinkage when the resin is solidified on account of the gas pressure upon the foaming. The latent heat is deprived from the interior of the molten resin upon the foaming, and thus the cooling strain and the warpage are decreased.

Further, the supercritical fluid has a high density, and the supercritical fluid is weighed with ease. Therefore, the supercritical fluid is advantageous to stabilize the amount of introduction into the molten resin. For example, a method of Japanese Patent No. 3788750 has been disclosed as a technique for stably and quantitatively supplying the physical foaming agent as described above into the plasticizing cylinder. According to Japanese Patent No. 3788750, the resin internal pressure is controlled by the pressure of a load cell connected to a screw, i.e., by the back pressure of the screw, and thus the supply amount of the foaming agent is controlled. Japanese Patent No. 4144916 discloses a system wherein the back pressure of a screw is raised, and the pressure of the forward end of the screw at which a physical foaming agent is dissolved is maintained at a pressure in the supercritical state so that the separation is suppressed between the resin and the physical foaming agent.

In the meantime, in the production method in which the modifying material dissolved in pressurized carbon dioxide is kneaded with the molten resin in the plasticizing cylinder as described above and only carbon dioxide is further discharged, a problem arises such that the amount of pressurized carbon dioxide, which is actually introduced, varies or fluctuates in every shot, and the amount of pressurized carbon dioxide cannot be controlled.

Further, in the production method in which carbon dioxide is discharged from the plasticizing cylinder, a problem of vent up arises. The vent up is such a phenomenon that the molten resin simultaneously leaks from a discharge port for discharging pressure-reduced carbon dioxide. The main cause of the bent up is considered as follows. That is, the resin viscosity is lowered due to the kneading of carbon dioxide, and the resin undergoes the volume expansion due to the sudden pressure reduction to be performed for the purpose of gas discharge.

Further, a problem as described below arises in the foam injection molding based on the use of the physical foaming agent described above. In order to raise the forming density of a molded product in the foam injection molding, it is effective that the physical foaming agent is dissolved in the molten resin at a concentration approximate to the saturated solubility (saturated concentration) in the plasticizing cylinder. Accordingly, the physical foaming agent can be supersaturated with respect to the molten resin in a high pressure region upon the injection and charging into the mold, and it is possible to generate a large number of foaming nuclei.

In the case of the conventional foam injection molding method, the molten resin is extruded to the frontward of the screw in accordance with the plasticization, and the pressure of the molten resin is controlled by the back pressure of the screw. However, the back pressure and the pressure are different from each other in many cases at the frontward portion of the screw at which any difference tends to arise in the viscosity and the density of the resin on account of the fact that the foaming agent is not kneaded uniformly or homogeneously, wherein it has been impossible to sufficiently control the pressure. Therefore, the molten resin and the physical foaming agent tend to cause the phase separation at the frontward portion of the screw. In particular, this phenomenon is conspicuous when the compatibility is low between the both. Further, in the plasticizing step based on the rotation of the screw, the physical foaming agent is kneaded by utilizing the shearing of the screw in a short period of time. Therefore, it has been difficult to dissolve the physical foaming agent in an amount approximate to the saturated solubility in the molten resin. Further, if the concentration of the physical foaming agent in the molten resin is high, the risk is further raised to cause the phase separation between the molten resin and the physical foaming agent. Therefore, in the case of the conventional foam injection molding method, it has been necessary that the concentration of the physical foaming agent should be lowered to be about $1/5$ to $1/10$ of the saturated solubility.

It has been necessary that the pressure of the physical foaming agent introduced into the plasticizing cylinder should be raised in order to form a large number of foaming nuclei during the injection and charging into the mold while providing the low ratio of the concentration of the physical foaming agent in the molten resin with respect to the saturated solubility as described above. However, this results in a factor to raise the initial cost of the apparatus.

The conventional foam injection molding method involves another problem such that the amount of the foaming agent introduced into the molten resin varies or fluctuates in every shot. The following artifice has been made to quantitatively supply an amount of the foaming agent introduced into the molten resin in the conventional foam injection molding method. That is, for example, the pressure in the plasticizing cylinder, which is provided in the vicinity of the introducing port for the physical foaming agent, is subjected to the feedback, and the amount of introduction of the physical foaming agent is determined so that the differential pressure, which is provided between the pressure subjected to the feedback and the pressure of the physical foaming agent to be introduced, is constant.

However, the pressure in the plasticizing cylinder subjected to the feedback is the pressure provided one shot before, wherein the feedback is not perform in real-time. Further, the pressure in the plasticizing cylinder subjected to the feedback is obtained by detecting the back pressure of the screw. The amount of dissolution of the foaming agent is not completely uniform in the plasticizing cylinder. Therefore, the pressure in the plasticizing cylinder is sometimes distributed while providing the pressures different from the screw back pressure to be detected. Therefore, the amount of the foaming agent actually introduced into the molten resin is varied or fluctuated for every shot, and it has been impossible to control the amount of the foaming agent.

The present teaching relates to a kneading apparatus in which a pressurized fluid is kneaded with a molten resin in a plasticizing cylinder and at least a part of the pressurized fluid is discharged and a production method for producing a thermoplastic resin molded product in which the kneading apparatus is used. An object of the present teaching is to constantly stabilize the amount of the pressurized fluid to be introduced for each shot. Another object of the present teaching is to suppress the vent up of the molten resin in the kneading apparatus and the production method. Further, the present teaching relates to a foam injection molding method for a thermoplastic resin. Still another object of the present teaching is to dissolve a physical foaming agent in a plasticizing cylinder, in a molten resin at a concentration approximate to a saturated solubility before injection.

SUMMARY OF THE INVENTION

According to a first aspect of the present teaching, there is provided a kneading apparatus for a thermoplastic resin; including a plasticizing cylinder which has a high pressure kneading zone for kneading a molten resin obtained by plasticizing and melting the thermoplastic resin with a pressurized fluid, and a pressure reduction zone for discharging the gasified pressurized fluid from the molten resin kneaded with the pressurized fluid; a screw which is arranged rotatably and movably back and forth in the plasticizing cylinder; a downstream side seal mechanism which is provided between the high pressure kneading zone and the pressure reduction zone and which shuts off communication between the high pressure kneading zone and the pressure reduction zone; and a pressure reduction zone pressure adjusting mechanism which is connected to the pressure reduction zone of the plasticizing cylinder and which controls a pressure of the pressure reduction zone so that the pressure is not less than an atmospheric pressure and the pressure is not more than a maximum pressure of the high pressure kneading zone that is achieved when kneading the molten resin with the pressurized fluid, when the downstream side seal mechanism shuts off the communication between the high pressure kneading zone and the pressure reduction zone.

According to a second aspect of the present teaching, there is provided a production method for producing a thermoplastic resin molded product including: providing a plasticizing cylinder which has a high pressure kneading zone for kneading a molten resin obtained by plasticizing a thermoplastic resin with a pressurized fluid, and a pressure reduction zone for discharging the gasified pressurized fluid from the molten resin kneaded with the pressurized fluid; plasticizing the thermoplastic resin to provide the molten resin; shutting off communication between the high pressure kneading zone and the pressure reduction zone; kneading the molten resin with the pressurized fluid in a state in which the communication between the high pressure kneading zone and the pressure reduction zone is shut off; controlling a pressure of the pressure reduction zone so that the pressure is not less than an atmospheric pressure and the pressure is not more than a maximum pressure of the high pressure kneading zone which is achieved when kneading the molten resin with the pressurized fluid, in the state in which the communication between the high pressure kneading zone and the pressure reduction zone is shut off; communicating the high pressure kneading zone and the pressure reduction zone; lowering a pressure of the molten resin kneaded with the pressurized fluid to separate the gasified pressurized fluid from the molten resin; and molding, into a desired shape, the molten resin from which the gasified pressurized fluid is separated.

DESCRIPTION OF THE PREFERRED EMBODIMENTS

An explanation will be made below with reference to the drawings about a kneading apparatus according to an embodiment of the present teaching, a production method for producing a thermoplastic resin molded product based on the use of the kneading apparatus, and a foam injection molding method.

First Embodiment

In a first embodiment, pressurized carbon dioxide is used as the pressurized fluid, and a functional material is further contained in pressurized carbon dioxide. An explanation will be made about a kneading apparatus in which the functional material is kneaded with a molten resin together with pressurized carbon dioxide in a plasticizing cylinder and only carbon dioxide is discharged, and a production method for producing a thermoplastic resin molded product based on the use of the kneading apparatus.

<Kneading Apparatus>

Figure 1:
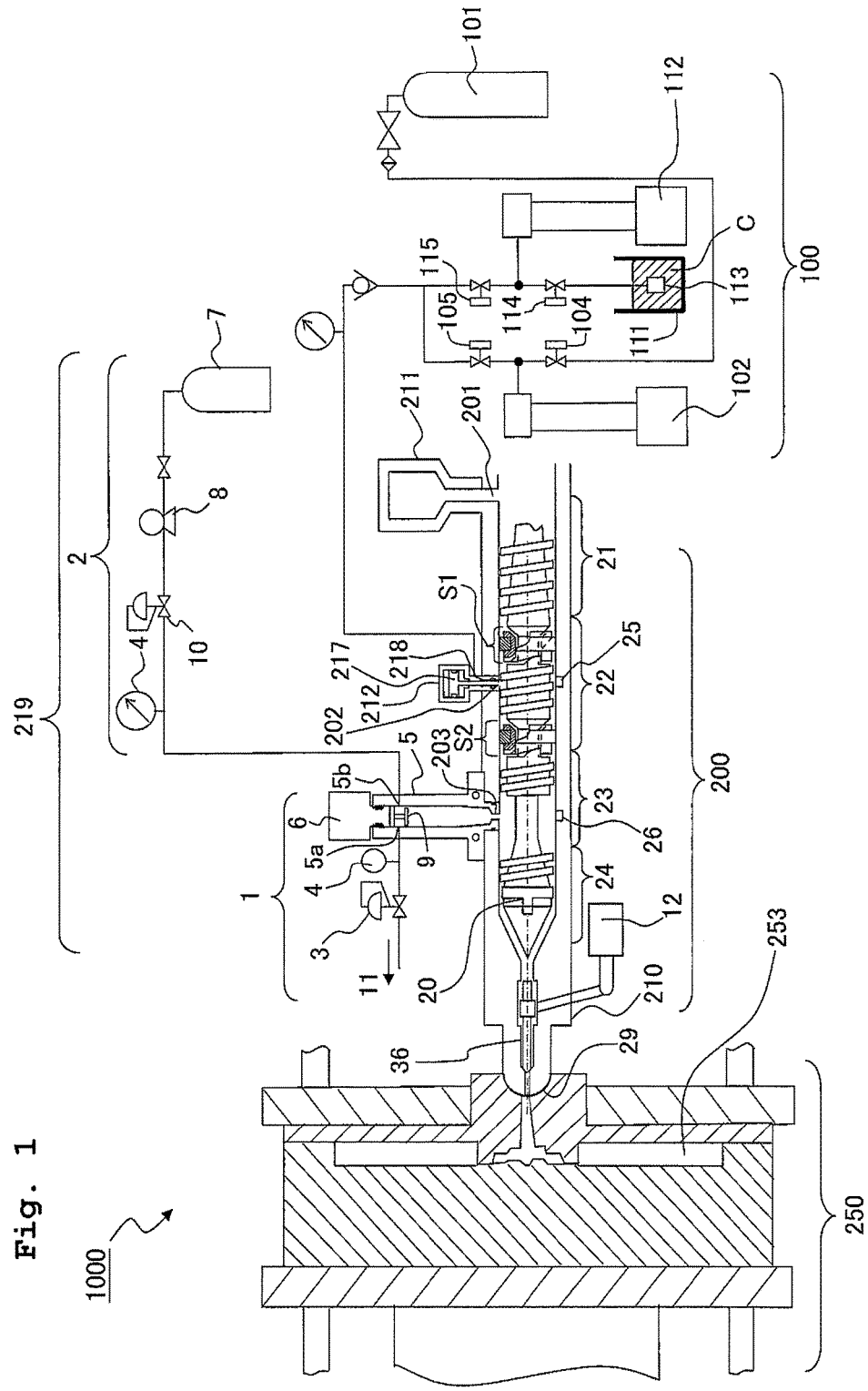
FIG. 1 shows a schematic sectional view illustrating an exemplary kneading apparatus and an exemplary molding machine including the kneading apparatus according to a first embodiment of the present teaching.

As shown in FIG. 1, a kneading apparatus 200 is provided for a molding machine 1000. The molding machine 1000 includes the kneading apparatus 200, a pressurized fluid supply apparatus 100 which supplies the pressurized fluid to the kneading apparatus 200, a clamping unit 250 which is provided with a mold, and a control unit (not shown) which controls the operations of the pressurized fluid supply apparatus 100, the kneading apparatus 200, and the clamping unit 250.

Figure 2:
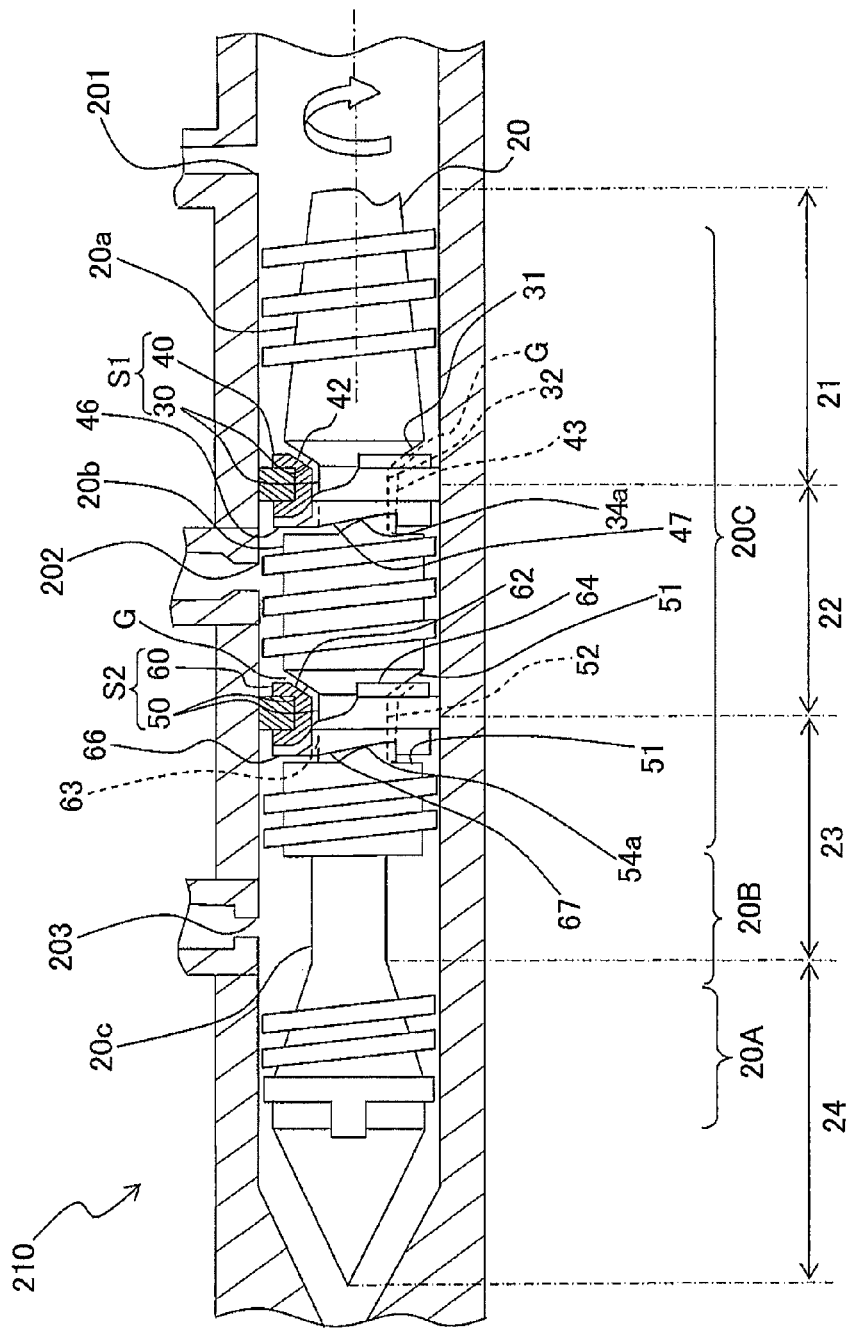
FIG. 2 shows a schematic sectional view of main parts or components illustrating the exemplary kneading apparatus according to the first and second embodiments, depicting a state in which a high pressure kneading zone and a pressure reduction zone are communicated with each other.
Figure 3:
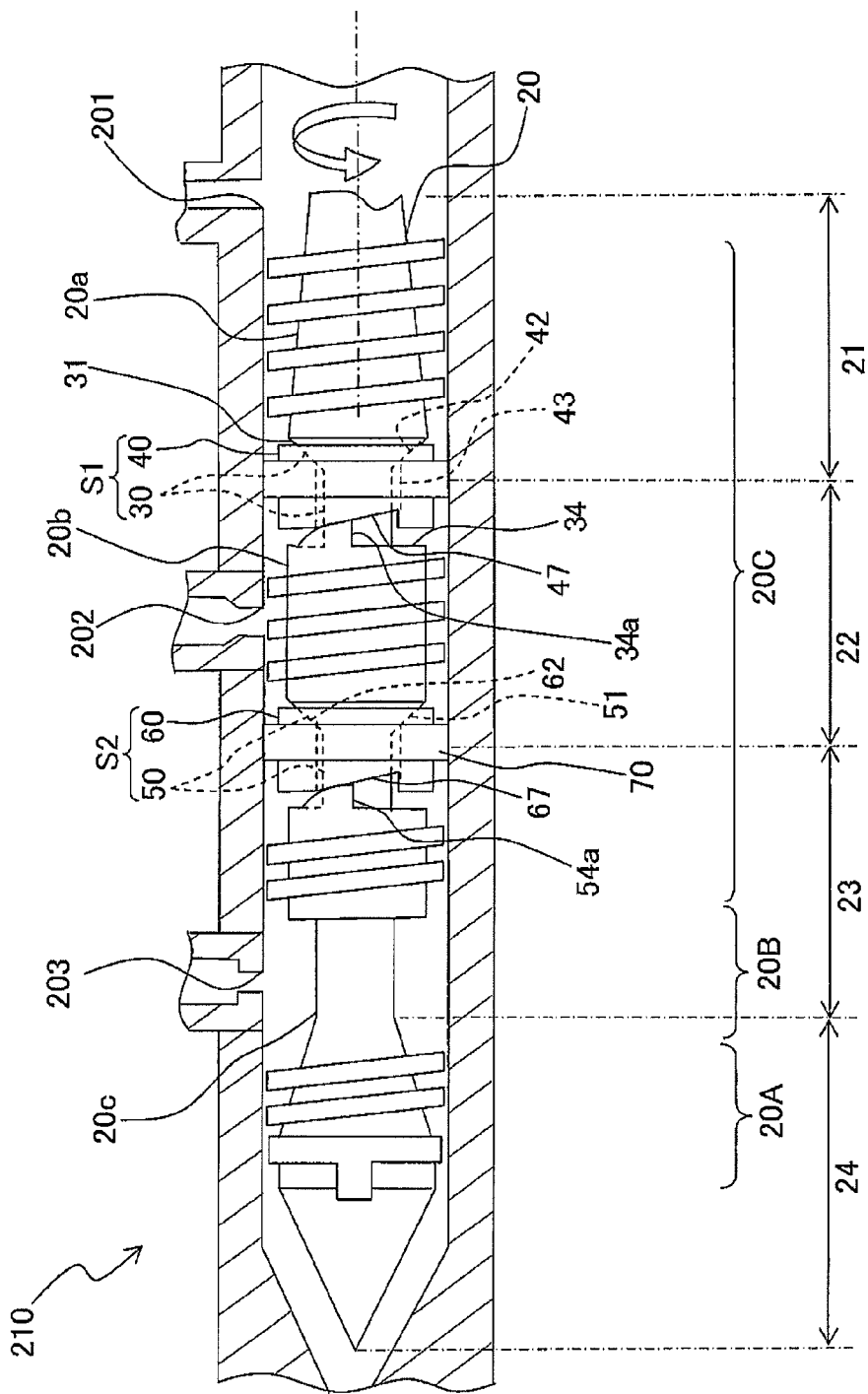
FIG. 3 shows a schematic sectional view of main parts or components illustrating the exemplary kneading apparatus according to the first and second embodiments, depicting a state in which the communication between the high pressure kneading zone and the pressure reduction zone is shut off.

The kneading apparatus 200 shown in FIG. 1 includes a plasticizing cylinder 210, a screw 20 which is arranged rotatably and movably back and forth in the plasticizing cylinder 210, an upstream side seal mechanism S1 and a downstream side seal mechanism S2 which are arranged in the plasticizing cylinder 210, and a pressure reduction zone pressure adjusting mechanism 219 which is connected to the plasticizing cylinder 210. In this embodiment, the plasticized and melted molten resin is allowed to flow from the right to the left in the plasticizing cylinder 210 as viewed in FIGS. 1 to 3. Therefore, the right as viewed in FIGS. 1 to 3 is defined as "upstream" or "backward", and the left is defined as "downstream" or "forward (frontward)" at the inside of the plasticizing cylinder 210 according to the embodiment of the present teaching.

Further, although not shown in the drawings, rotary driving means such as a rotation motor or the like for rotating the screw 20 and moving means such as a ball screw and a motor or the like for driving the same to move the screw 20 back and forth are connected to a back end portion of the plasticizing cylinder 210 disposed on the upstream side. As shown in FIGS. 2 and 3, the kneading apparatus 200 of this embodiment is constructed in the same manner as the construction of any conventionally known kneading apparatus, so that the forward rotation is performed to feed the molten resin frontwardly (toward the nozzle portion) when the screw 20 is rotated counterclockwise, while the reverse rotation is performed when the screw 20 is rotated clockwise, as viewed from the backward side of the plasticizing cylinder 210.

Those formed on the upper side surface of the plasticizing cylinder 210 are, as referred to in the following order from the upstream side, a resin supply port 201 for supplying the thermoplastic resin to the plasticizing cylinder 210, an introducing port 202 for introducing pressurized carbon dioxide as a pressurized fluid into the plasticizing cylinder 210, and a vent 203 for discharging the gasified pressurized fluid from the inside of the plasticizing cylinder 210. As described later on, a resin supplying hopper 211 and an introducing valve 212 are arranged for the resin supply port 201 and the introducing port 202 respectively, and a pressure reduction zone pressure adjusting mechanism 219 is connected to the vent 203. Further, the introducing valve 212 is connected to the pressurized fluid supply apparatus 100 which is provided outside the kneading apparatus 200.

Further, a band heater (not shown) is arranged on an outer wall surface of the plasticizing cylinder 210. Accordingly, the plasticizing cylinder 210 is heated, and the thermoplastic resin is plasticized. Further, sensors 25, 26, which monitor the pressure and the temperature, are provided on the lower side surface of the plasticizing cylinder 210, at a position opposed to the introducing port 202 and a position opposed to the vent 203 respectively.

In the kneading apparatus 200 having the structure as described above, the thermoplastic resin is supplied from the resin supply port 201 into the plasticizing cylinder 210, and the thermoplastic resin is plasticized by the band heater to provide the molten resin which is fed to the downstream in accordance with the forward rotation of the screw 20. The molten resin, which is fed to the position in the vicinity of the introducing port 202, is brought in contact and kneaded with the introduced pressurized fluid at a high pressure. Subsequently, the resin internal pressure of the molten resin brought in contact and kneaded with the pressurized fluid is lowered, and thus the gasified pressurized fluid is separated from the molten resin. The gasified pressurized fluid is discharged from the vent 203. The molten resin, which is further fed frontwardly, is extruded by the forward end portion of the screw 20. The pressure of the molten resin serves as the reaction force with respect to the screw 20. The screw 20 is moved backwardly by the reaction force, and thus the weighing is performed. Accordingly, the plasticizing zone 21 in which the thermoplastic resin is plasticized to provide the molten resin, the high pressure kneading zone 22 in which the molten resin and the pressurized fluid introduced from the introducing port 202 are brought in contact and kneaded with each other at the high pressure, and the pressure reduction zone 23 in which the pressurized fluid separated from the molten resin is discharged from the vent 203 by lowering the resin internal pressure of the molten resin brought in contact and kneaded with the pressurized fluid are formed in the plasticizing cylinder 210, as referred to in this order from the upstream side. Further, the remelting zone 24 is provided on the downstream from the pressure reduction zone 23. As described later on, in this embodiment, the viscosity of the molten resin is raised in the pressure reduction zone. The molten resin, which has the raised viscosity, is plasticized and melted again before the injection in the remelting zone 24. In order to efficiently perform the contact and kneading for the molten resin and the pressurized fluid, a plurality of introducing ports 202 and a plurality of vents 203 may be provided for the plasticizing cylinder 210, and a plurality of high pressure kneading zones 22 and a plurality of pressure reduction zones 23 may be formed in the plasticizing cylinder 210.

As shown in FIGS. 1 to 3, an upstream side seal mechanism S1 and a downstream side seal mechanism S2, which temporally shuts off the communication state between the zones 21, 22, 23, are arranged between the plasticizing zone 21, the high pressure kneading zone 22, and the pressure reduction zone 23 described above respectively. Accordingly, for example, when the pressurized fluid is introduced into the high pressure kneading zone 22, the upstream side and the downstream side of the high pressure kneading zone 22 are mechanically sealed, and the high pressure kneading zone 22 can be reliably disconnected (shut off) from the adjoining zones 21, 23. As a result, the pressure of the high pressure kneading zone 22 is maintained at a high pressure. Therefore, the functional material contained in the pressurized fluid can be effectively permeated into the molten resin. Various mechanisms are available for the upstream side seal mechanism S1 and the downstream side seal mechanism S2, provided that the communication between the zones 21, 22, 23 is shut off. However, it is preferable to use those which shut off the communication between the zones in accordance with the rotation state of the screw 20 as described later on.

The pressure reduction zone pressure adjusting mechanism 219 controls the pressure of the pressure reduction zone so that the pressure is not less than the atmospheric pressure and the pressure is not more than the maximum pressure (highest pressure) of the high pressure kneading zone 22 which is achieved when the pressurized fluid is brought in contact and kneaded with the molten resin, when the communication between the high pressure kneading zone 22 and the pressure reduction zone 23 is shut off by means of the downstream side seal mechanism S2 described above. When the pressurized fluid is introduced into the high pressure kneading zone 22, the pressure is raised. In this context, the "maximum pressure" means the maximum (highest) pressure (maximum achieved pressure or maximum reached pressure) of the high pressure kneading zone 22 as achieved or reached during the period in which the pressurized fluid is brought in contact and kneaded with the molten resin. The pressure reduction zone pressure adjusting mechanism 219 has, for example, a buffer container 5, a gas discharge mechanism 1 which is connected to a gas discharge port 11 via a pressure gauge 4 and a back pressure valve 3 from a connection port 5a of the buffer container 5, and a pressurizing mechanism 2 which is connected to a connection port 5b of the buffer container 5 via a booster pump 8, a pressure-reducing valve 10, and a pressure gauge 4 from an inert gas bomb 7 for an inert gas such as nitrogen or the like. The pressure reduction zone pressure adjusting mechanism 219 controls the pressure in the pressure reduction zone 23 of the plasticizing cylinder 210 so that the pressure have a predetermined value by means of the gas discharge mechanism 1 and/or the pressurizing mechanism 2.

For example, the back pressure valve 3 of the gas discharge mechanism 1 is set to have a predetermined value, and the discharge amount of the gas of the pressurized fluid is restricted. Accordingly, it is possible to control the pressure in the pressure reduction zone 23. On the contrary, if it is necessary to raise the pressure in the pressure reduction zone 23, then the pressure-reducing valve 10 of the pressurizing mechanism 2 is set to have a predetermined value, and the inert gas such as pressurized nitrogen or the like is introduced into the pressure reduction zone 23 from the inert gas bomb 7. Accordingly, it is possible to control the pressure. When the pressure in the pressure reduction zone 23 is raised before the start of the molding by means of the pressurizing mechanism 2, then it is possible to suppress the vent up which would be otherwise caused by the sudden pressure reduction, and hence this procedure is preferred. In this way, in the embodiment of the present teaching, the pressure reduction zone pressure adjusting mechanism 219 controls the pressure of the gas in the pressure reduction zone 23. It is necessary that the pressure in the pressure reduction zone 23 should be retained to be not less than the atmospheric pressure. Therefore, the pressure reduction zone pressure adjusting mechanism 219 of this embodiment does not have any pressure-reducing mechanism such as a vacuum pump or the like.

In this embodiment, the pressure reduction zone pressure adjusting mechanism 219 controls the pressure of the pressure reduction zone 23 so that the pressure is not less than the atmospheric pressure and the pressure is not more than the maximum pressure of the high pressure kneading zone 22 which is achieved when the pressurized fluid is brought in contact and kneaded with the molten resin. Accordingly, the amount of the pressurized fluid to be introduced into the plasticizing cylinder 210 can be stably controlled for every shot. The reason thereof will be explained below with reference to FIGS. 7 and 8 while making comparison with a conventional kneading apparatus.

Figure 7:
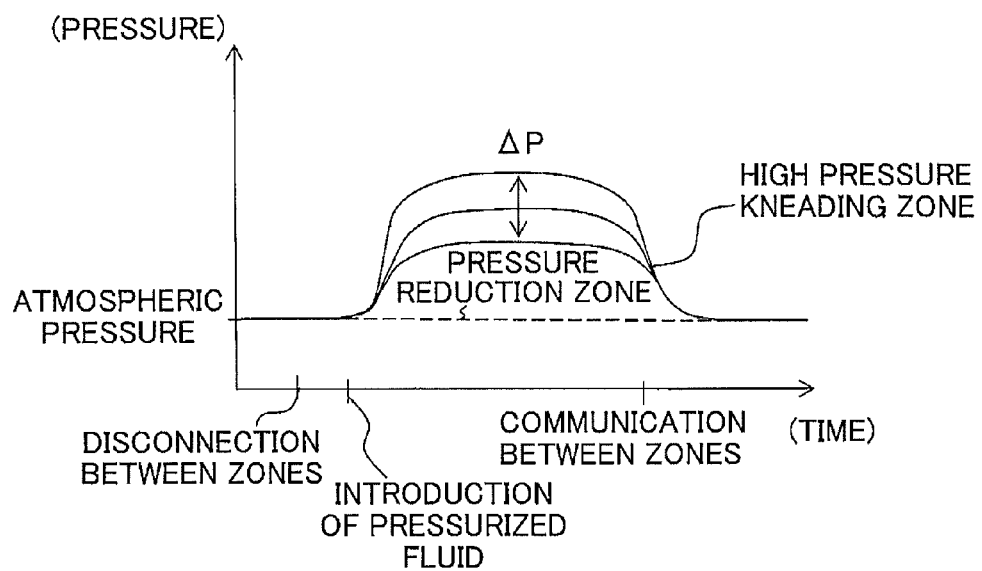
FIG. 7 shows the time-dependent change of the pressure in a high pressure kneading zone and a pressure reduction zone in a conventional plasticizing cylinder.
Figure 8:
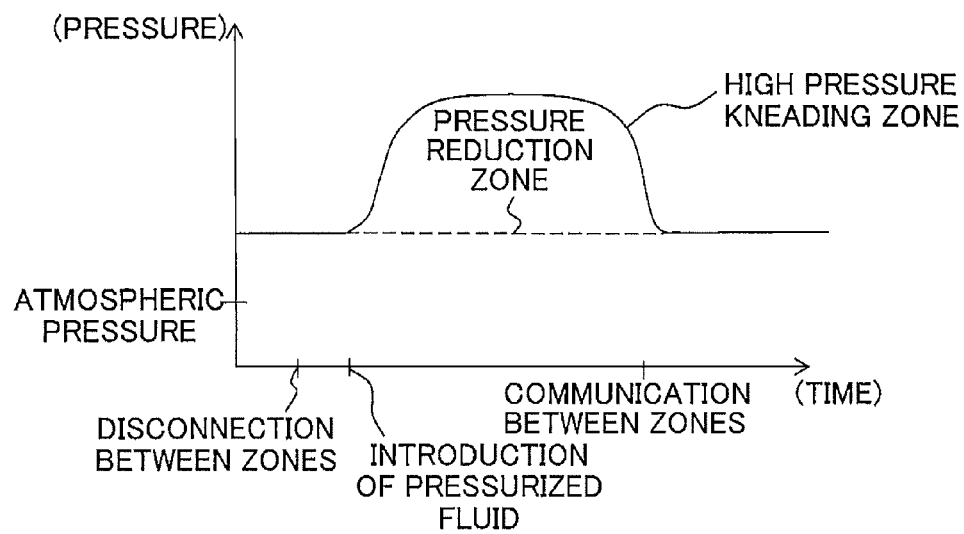
FIG. 8 shows the time-dependent change of the pressure in the high pressure kneading zone and the pressure reduction zone in the plasticizing cylinder according to the first and second embodiments.

As described above, when the pressurized fluid is introduced into the high pressure kneading zone 22, the high pressure kneading zone 22 is shut off (disconnected) from the pressure reduction zone 23. As shown in FIGS. 7 and 8, the pressurized fluid is introduced after the high pressure kneading zone 22 is shut off from the pressure reduction zone 23, and thus the pressure of the high pressure kneading zone 22 is raised. Further, the high pressure kneading zone 22 is communicated with the pressure reduction zone 23 again after a predetermined period of time elapses. Accordingly, the pressure of the high pressure kneading zone 22 is lowered to the pressure of the pressure reduction zone 23. The cycle, in which the pressure of the high pressure kneading zone 22 is raised and lowered, is repeated for every shot.

In the case of the conventional high pressure kneading apparatus which does not have the pressure reduction zone pressure adjusting mechanism 219, the pressure (back pressure of the screw), which is applied to a load cell (not shown) for pressurizing the screw, is detected, and the pressure control is performed by means of the load cell, in relation to the resin pressure provided at the forward end portion in the plasticizing cylinder. The resin pressure, which is provided at the forward end portion, is interrupted by the pressure reduction zone 23 which is open to the atmospheric air. Therefore, it has been impossible to control the high pressure kneading zone.

As shown in FIG. 7, in the case of the conventional high pressure kneading apparatus, the achieved pressure fluctuates or varies for every shot, although the pressurized fluid or the like is introduced into the plasticizing cylinder while controlling the flow rate to be constant by means of a syringe pump or the like. FIG. 7 shows the fluctuation of the achieved pressure by $\Delta P$. It is presumed that FIG. 7 shows the fluctuation in every shot of the amount of the pressurized fluid actually introduced into the plasticizing cylinder, because the resin density fluctuates in the plasticizing cylinder disposed on the receiving side. Further, it is affirmed that the factor of the pressure fluctuation between the shots also resides in such a fact that the differential pressure is increased with respect to the pressure of the introduced pressurized fluid and the fluctuation tends to occur, because the pressure is suddenly raised from the atmospheric pressure.

In the case of the plasticizing apparatus 200 of this embodiment, the pressure in the pressure reduction zone 23, which is provided when the communication between the high pressure kneading zone 22 and the pressure reduction zone 23 is shut off, is controlled by the pressure reduction zone pressure adjusting mechanism 219 so that the pressure is not less than the atmospheric pressure and the pressure is not more than the maximum pressure of the high pressure kneading zone 22 which is achieved when the pressurized fluid is brought in contact and kneaded with the molten resin. The pressure reduction zone pressure adjusting mechanism 219 can directly control the pressure in the pressure reduction zone 23. Therefore, the high pressure kneading zone 22 can be controlled to have the same pressure before the pressure increase. In other words, when the high pressure kneading zone 22 and the pressure reduction zone 23 are communicated with each other, the pressure reduction zone pressure adjusting mechanism 219 controls the high pressure kneading zone 22 and the pressure reduction zone 23 to have the constant pressure. Accordingly, the pressure of the high pressure kneading zone 22, which cannot be hitherto controlled, can be made constant. It is possible to suppress the fluctuation of the differential pressure when the mixture pressurized fluid is introduced. As a result, as shown in FIG. 8, the achieved pressure in every shot, i.e., the amount of introduction of the pressurized fluid can be made approximately constant.

The pressure in the pressure reduction zone 23, which is provided when the pressure reduction zone 23 is shut off from the high pressure kneading zone 22, is not specifically limited, provided that the pressure is not less than the atmospheric pressure and the pressure is not more than the maximum pressure of the high pressure kneading zone 22 which is achieved when the pressurized fluid is brought in contact and kneaded with the molten resin. The reason, why the pressure of the pressure reduction zone 23 is not less than the atmospheric pressure, is as follows. That is, if the pressure is less than the atmospheric pressure, the gasified pressurized fluid is to be forcibly discharged. It is feared that the molten resin may cause the vent up. Further, in this situation, any equipment such as a vacuum pump or the like is required, and hence the high cost is required. On the other hand, the reason, why the pressure of the pressure reduction zone 23 is not more than the maximum achieved pressure of the high pressure kneading zone 22, is as follows. That is, it is intended that the pressurized fluid is introduced smoothly, and the introduced molten resin is subjected to the pressure reduction so that the pressurized fluid is gasified and separated from the molten resin. It is preferable that the pressure in the pressure reduction zone 23 is 0.5 to 6 MPa. When the pressure in the pressure reduction zone 23 is not less than 0.5 MPa, then it is possible to decrease the differential pressure with respect to the pressurized fluid introduced into the high pressure kneading zone 22, and it is possible to suppress the pressure fluctuation associated with the communication and the disconnection between the zones. When the pressure in the pressure reduction zone is not more than 6 MPa, it is possible to avoid such a situation that the functional material is discharged together with the pressurized fluid in a state of being dissolved in the pressurized fluid. On the other hand, for example, when the functional material is modified (changed in quality) due to, for example, the thermal decomposition and/or the dehydration condensation reaction in the plasticizing cylinder 210, and the functional material becomes insoluble in the solvent and pressurized carbon dioxide as the pressurized fluid, then it is not feared that the functional material may be discharged together with the pressurized fluid. Therefore, the pressure in the pressure reduction zone 23, which is provided when the communication between the high pressure kneading zone 22 and the pressure reduction zone 23 is shut off or blocked, may be set to be relatively high, i.e., 6 to 20 MPa. The pressure of the pressure reduction zone 22 may be set to be relatively high, and the molded product may be foamed. Further, it is preferable that the pressure in the pressure reduction zone 23, which is provided when the communication between the high pressure kneading zone 22 and the pressure reduction zone 23 is shut off or blocked, is controlled to be a constant pressure, in view of the fact that the pressure in the plasticizing cylinder 210 is further stabilized.

The buffer container 5 of the pressure reduction zone pressure adjusting mechanism 219 of this embodiment may function as a resin trap when the vent up is caused. The buffer container 5 of this embodiment has a lower portion which is connected to the vent 203 and an upper opening which is closed by a lid 6. An arm, which extends to the interior of the buffer container 5 when the lid 6 closes the buffer container 5, is provided at a lower portion of the lid 6. A filter 9, through which only the gas is permeated, is connected to the forward end of the arm. As shown in FIG. 1, the gas discharge mechanism 1 and the pressurizing mechanism 2 of the pressure reduction zone pressure adjusting mechanism 219 are connected to the buffer container 5 by means of pipings. The connection ports 5a, 5b thereof are positioned on the side of the lid 6 as compared with the filter 9 when the buffer container 5 is closed by the lid 6. Owing to the construction provided as described above, when the vent up of the molten resin is caused from the vent 203, then the molten resin is trapped by the buffer container 5, and the molten resin is blocked by the filter 9, wherein the molten resin does not invade the side of the lid 6 from the filter 9. Therefore, it is not feared that the molten resin may enter the pipings from the connection ports 5a, 5b of the gas discharge mechanism 1 and the pressurizing mechanism 2 to clog up the pipings. The lid 6 and the filter 9 are detachable from the container 5. Therefore, any resin subjected to the vent up can be removed, and the container 5, the lid 6, and the filter 9 can be washed or cleaned with ease as well. The use of the buffer container 5 which functions as the resin trap as described above is effective especially in the process for determining the driving condition of the kneading apparatus 200.

The kneading apparatus 200 of this embodiment may be further provided with a temperature regulating mechanism such as a cooling mechanism or the like for the pressure reduction zone 23. When the temperature regulating mechanism such as the cooling mechanism or the like is provided for the pressure reduction zone 23, and the pressure reduction zone 23 is cooled, then it is possible to raise the viscosity of the molten resin in the pressure reduction zone 23. Accordingly, it is possible to avoid the vent up which would be otherwise caused when the pressurized fluid is discharged. The main cause or factor of the vent up is that the molten resin, which is plasticized and which has a low viscosity, is suddenly subjected to the pressure reduction to cause the expansion, on account of the pressure reduction of the molten resin containing the pressurized fluid. Therefore, the expansion of the resin can be suppressed and the vent up can be avoided by cooling the molten resin so that the molten resin is in a semi-solidified state. In this embodiment, a cooling jacket (not shown) is provided as the cooling mechanism around the pressure reduction zone 23 of the plasticizing cylinder 210. The temperature difference between the pressure reduction zone and the other zones is arbitrary, because the proper value changes depending on the resin type and the viscosity change brought about when the pressurized fluid is contained. However, it is preferable that the temperature difference is within a range of 10 to 100° C. For example, it is preferable that the plasticizing zone 21, the high pressure kneading zone 22, and the remelting zone 24 of the plasticizing cylinder are controlled to 240 to 280° C. by means of the band heater, and the pressure reduction zone 23 is controlled to 190 to 230° C. by means of the cooling jacket. The cooling mechanism is not limited to the cooling jacket. Any cooling mechanism may be provided for the pressure reduction zone pressure adjusting mechanism 219, and the pressure reduction zone may be cooled thereby. In this case, the pressure reduction zone pressure adjusting mechanism 219 also has the function to control the temperature together with the pressure of the pressure reduction zone 23. For example, the following form or arrangement is available. That is, a water conduction hole, which allows cooling water to flow therethrough, is provided at a position which is brought in contact with the pressure reduction zone 23 at a lower portion of the buffer container 5 of the pressure reduction zone pressure adjusting mechanism 219 so that water is always allowed to flow. Accordingly, the upper surface of the plasticizing cylinder 210 in the pressure reduction zone 23 can be cooled as compared with the ambient plasticizing cylinder temperature. For example, water having a low temperature of about 30° C. can be used as water allowed to flow.

As shown in FIGS. 2 and 3, the following arrangement is also available in relation to the kneading apparatus 200 of this embodiment. That is, the screw 20 has first and second flight portions 20A, 20C which have flights, and a flat portion 20B which is interposed between the first and second flight portions and which has no flight, wherein at least a part of the flat portion 20B is positioned in the pressure reduction zone 23 when the pressurized fluid is discharged.

As described above, in this embodiment, the temperature of the pressure reduction zone 23 is controlled to be lower than those of the other zones in order to suppress the vent up of the molten resin. The viscosity of the molten resin is raised, and the molten resin is in the semi-solidified state. The flight of the screw is originally provided for the screw in order to move the molten resin having a low viscosity. The flight oppositely hinders the movement of the molten resin with respect to the molten resin having the high viscosity as described above. In this embodiment, the screw 20 (20B), which is positioned in the pressure reduction zone 23, has no flight. Therefore, the resin in the semi-solidified state is wound around the entire outer circumference of the flat portion 20B of the screw 20. Further, the resin is extruded by the molten resin disposed therebehind, and the resin is moved to the remelting zone 24 disposed on the downstream.

The resin in the semi-solidified state, which is cooled in the pressure reduction zone 23, is heated again, plasticized, and melted in the remelting zone 24 before being injected.

<Seal Mechanism>

Various mechanisms can be utilized for the upstream side seal mechanism S1 and the downstream side seal mechanism S2, provided that the communication between the zones 21, 22, 23 can be shut off. However, in this embodiment, the mechanisms, which communicate/shut off the zones in accordance with the rotation state of the screw 20, are used as explained below.

As shown in FIGS. 2 and 3, the upstream side seal mechanism S1 and the downstream side seal mechanism S2, which make communication and disconnection (shut off) between the zones 21, 22, 23 in accordance with the rotation state of the screw 20, are arranged between the plasticizing zone 21, the high pressure kneading zone 22, and the pressure reduction zone 23 described above respectively. Accordingly, when the pressurized fluid is introduced into the high pressure kneading zone 22, the upstream side and the downstream side of the high pressure kneading zone 22 are mechanically sealed in accordance with the rotation state of the screw 20. Therefore, the communication between the high pressure kneading zone 22 and the adjoining zones 21, 23 can be reliably shut off. According to the seal mechanisms S1, S2 of this embodiment, the high pressure kneading zone 22 can be communicated and disconnected with respect to the adjoining zones 21, 23 in accordance with the rotation state of the screw 20 without using any pressure control. Therefore, the flow resistance of the molten resin is small. Further, the high pressure kneading zone 22 can be sealed from the adjoining zones 21, 23 in accordance with the rotation state of the screw 20. Therefore, the pressure of the high pressure kneading zone 22 can be maintained at any arbitrary timing. Therefore, even when the resin having a high viscosity is brought in contact and kneaded, it is possible to maintain the high plasticizing ability. When the mechanical seal mechanisms S1, S2, which exhibit the sealing performance in accordance with the rotation state of the screw 20 as described above, are used, the sealing performance is scarcely deteriorated even when the high temperature molten resin passes through the seal mechanisms S1, S2. Therefore, the pressure of the high pressure kneading zone 22 is scarcely changed even after the molding machine is operated for a long period of time. Therefore, it is possible to stably produce the thermoplastic resin molded product for a long period of time. The seal mechanisms S1, S2 communicate and disconnect the high pressure kneading zone 22 with respect to the adjacent zones 21, 23 in accordance with the rotation state of the screw 20. Therefore, for example, when the forward rotation and the reverse rotation of the screw 20 are performed at arbitrary timings, then the resin internal pressure of the molten resin brought in contact and kneaded with the pressurized fluid can be lowered in a state in which the molten resin is allowed to stay in the high pressure kneading zone 22, and the gasified pressurized fluid can be separated from the molten resin. As a result, the molten resin, in which the concentration of the pressurized fluid is lowered, can be repeatedly brought in contact and kneaded with the pressurized fluid without feeding the molten resin frontwardly. It is possible to produce a molded product in which the functional material contained in the pressurized fluid is dispersed at a high concentration.

In the kneading apparatus 200 of this embodiment, the seal mechanism, which communicates and disconnects the high pressure kneading zone 22 with respect to the adjoining other zones 21, 23 in accordance with the rotation state of the screw 20 described above, is preferably provided at least on the downstream side of the high pressure kneading zone 22. It is more preferable that the seal mechanisms are provided on both of the upstream side and the downstream side of the high pressure kneading zone 22. That is, as understood from FIGS. 2 and 3, when the pressurized fluid is introduced into the high pressure kneading zone 22, the high pressure pressurized fluid acts on the seal mechanism S1 so that the plasticizing zone 21 and the high pressure kneading zone 22 are disconnected from each other on the upstream side of the high pressure kneading zone 22. On the other hand, on the downstream side of the high pressure kneading zone 22, the pressurized fluid and the molten resin allowed to flow from the upstream side act on the downstream side seal mechanism S2 so that the high pressure kneading zone 22 and the pressure reduction zone 22 are communicated with each other. Usually, the molten resin is charged on the upstream side of the high pressure kneading zone 22, and the pressurized fluid hardly leaks, because the seal mechanism is provided in the flow direction of the resin, i.e., in the direction so as to oppose the pressure gradient. Therefore, when a simple and convenient seal mechanism such as a check valve (non-return valve) or the like having a low spring pressure is arranged on the upstream side of the high pressure kneading zone 22, and the downstream side seal mechanism S2, which communicates and disconnects the high pressure kneading zone 22 and the pressure reduction zone 23 in accordance with the rotation state of the screw 20, is arranged at least on the downstream side of the high pressure kneading zone 22, then the high pressure kneading zone 22, in which the sealing performance tends to be lowered or deteriorated, can be reliably disconnected from the pressure reduction zone 23, and the high pressure state of the high pressure kneading zone 22 can be maintained during the contact and kneading. In this embodiment, the upstream side seal mechanism S1 and the downstream side seal mechanism S2, which are basically constructed in the same manner, are used. Therefore, the following explanation will be made principally about the downstream side seal mechanism S2.

Figure 4:
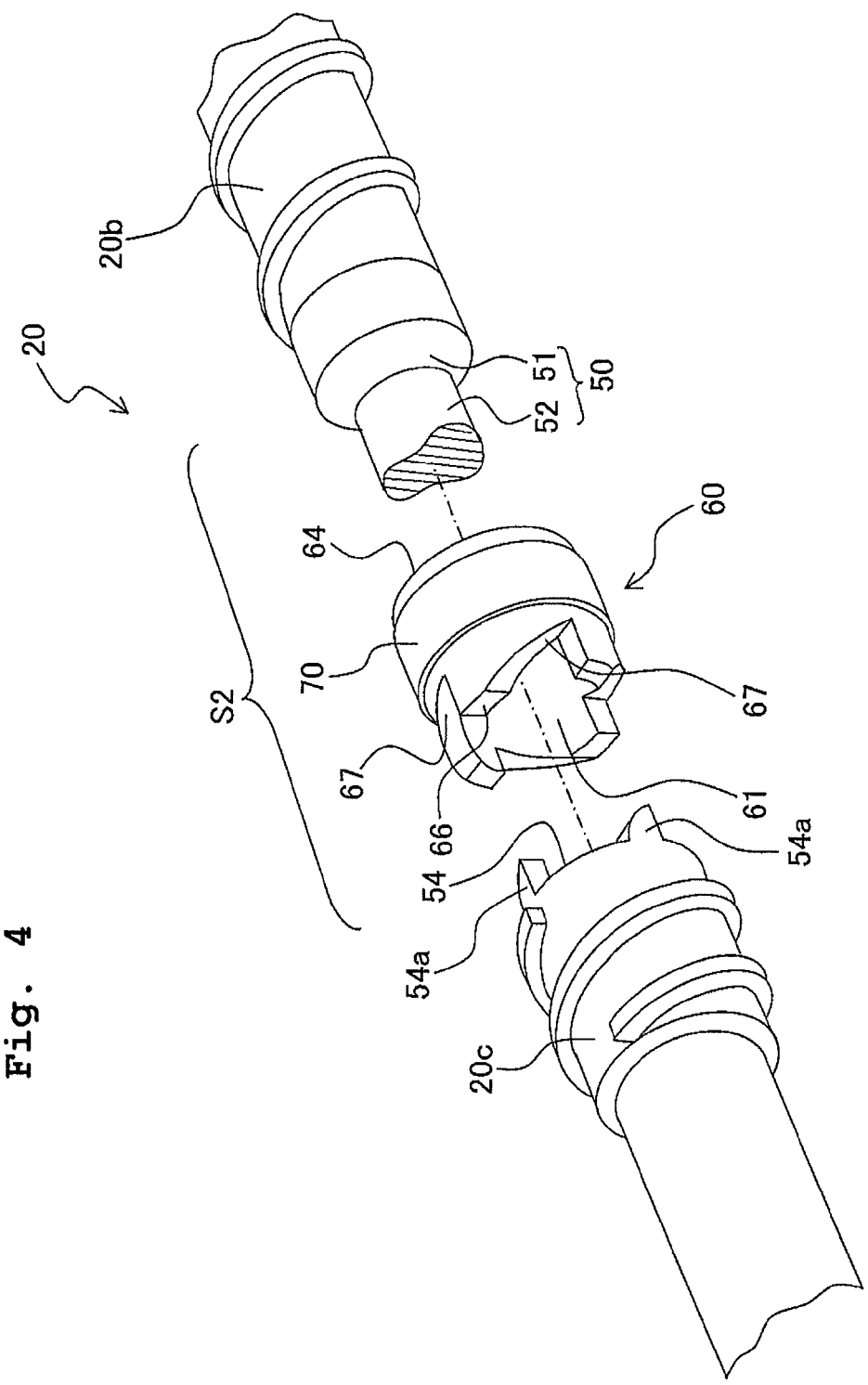
FIG. 4 shows a schematic perspective view illustrating an exemplary seal mechanism of the kneading apparatus according to the first and second embodiments.

As shown in FIG. 4, the screw 20 of this embodiment has a reduced diameter portion 50 which is disposed in a boundary area between the high pressure kneading zone 22 and the pressure reduction zone 23 and which has a reduced diameter as compared with those of areas adjacent to the boundary area. A downstream side seal ring 60 is externally fitted to the reduced diameter portion 50 in such a loosely fitted state that the downstream side seal ring 60 is movable in the axial direction (front-back direction) within a range of the reduced diameter portion 50. The downstream side seal mechanism S2 is constructed by the reduced diameter portion 50 and the downstream side seal ring 60. The upstream side seal mechanism S1 is also constructed by a reduced diameter portion 30 and an upstream side seal ring 40 in the same manner as described above. The screw 20 is divided into a first screw portion 20a, a second screw portion 20b, and a third screw portion 20c as disposed in this order from the upstream side in order that the upstream side and downstream side seal rings 40, 60 are externally fitted to the reduced diameter portions 30, 50 (see FIG. 2).

The reduced diameter portion 50, which is arranged between the high pressure kneading zone 22 and the pressure reduction zone 23, is constructed by a truncated cone portion (seal portion) 51 which is interconnected from the second screw portion 20b disposed on the upper side and which has a tapered surface inclined frontwardly (downwardly), and a cylindrical portion 52 which is interconnected from the truncated cone portion 51 and which has a horizontal surface extending horizontally in the axial direction. Projections 54a, which serve as fastening portions to prevent the downstream side seal ring 60 from being rotated, are formed at a plurality of positions at predetermined intervals in the circumferential direction on an end surface 54 of the third screw portion 20c disposed on the downstream side. The structure of the reduced diameter portion 50 is not specifically limited provided that the high pressure kneading zone 22 and the pressure reduction zone 23 can be communicated with each other and disconnected from each other. For example, the reduced diameter portion 50 may have such a structure that cylindrical portions having different diameters are interconnected to one another. Alternatively, the reduced diameter portion 50 may have such a structure that the truncated cone portion 51 is arranged on the downstream side.

Figure 5:
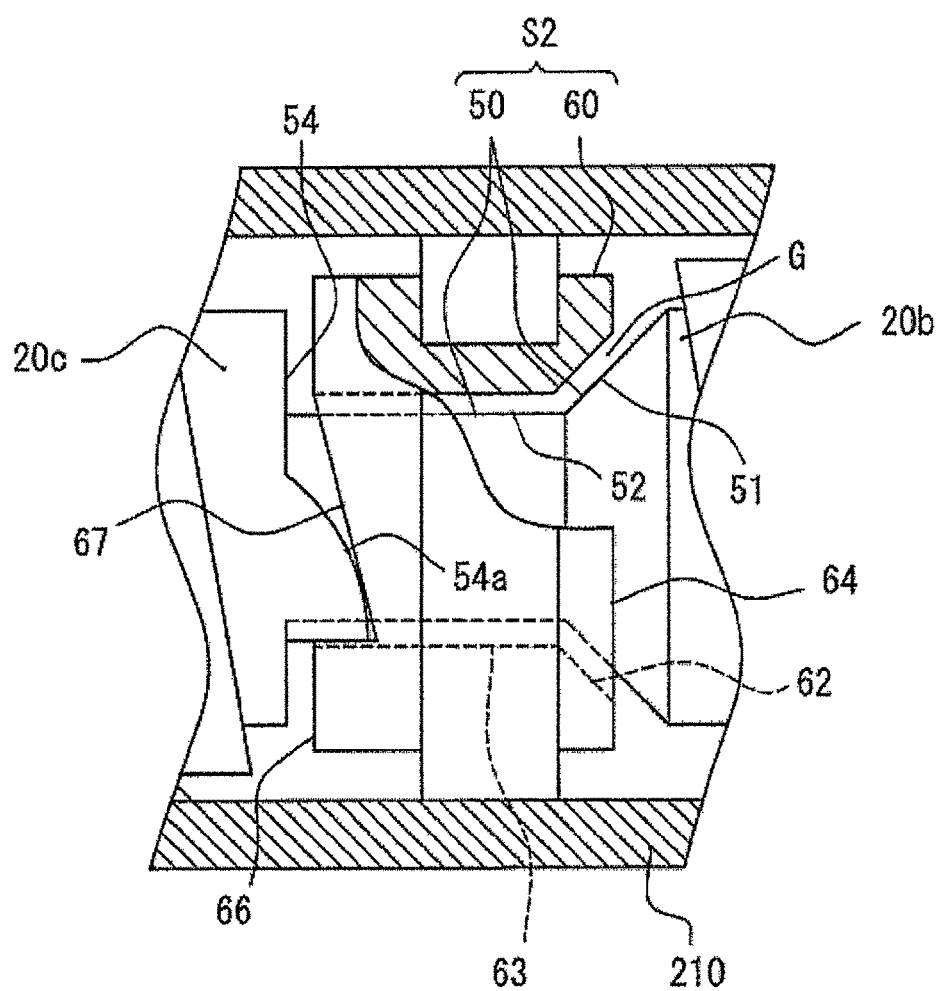
FIG. 5 shows a schematic enlarged sectional view of main parts or components illustrating the exemplary seal mechanism of the kneading apparatus according to the first and second embodiments.
Figure 6:
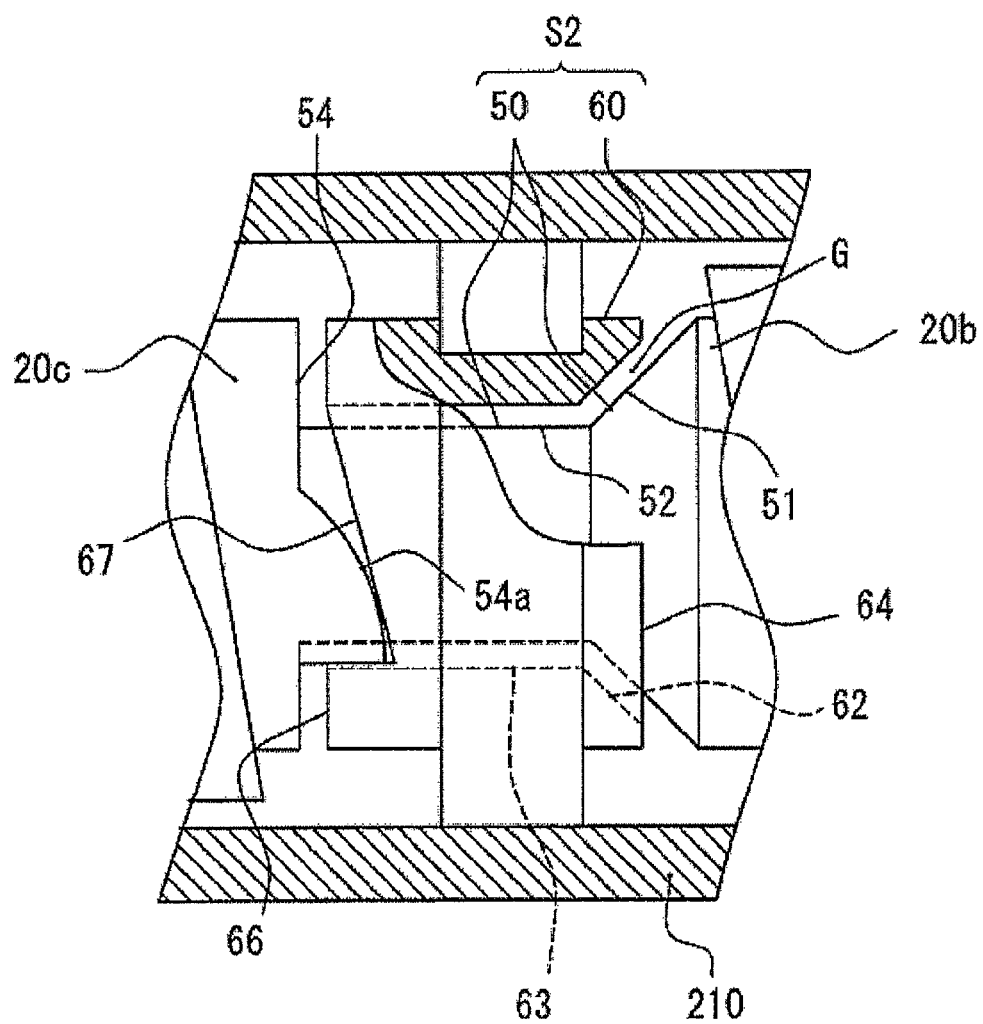
FIG. 6 shows a schematic enlarged sectional view of main parts or components illustrating another exemplary seal mechanism of the kneading apparatus according to the first and second embodiments.

As shown in FIG. 4, the downstream side seal ring 60 has a through-hole 61 so that the downstream side seal ring 60 is externally fitted to the reduced diameter portion 50 of the screw 20. As shown in FIGS. 5 and 6, the through-hole 61 is constructed by interconnecting, on the upstream side, a tapered portion 62 which has a tapered surface (contact surface) having diameters reduced frontwardly (downwardly) and an annular portion 63 which extends horizontally frontwardly (downwardly) from the tapered portion 62. The tapered surface of the tapered portion 62 of the downstream side seal ring 60 is formed to abut against at least a part of the tapered surface of the truncated cone portion 51 of the screw 20 in a tight contact state. The structure of the through-hole 61 is not specifically limited provided that the high pressure kneading zone 22 and the pressure reduction zone 23 can be connected with each other and disconnected from each other. For example, the through-hole 61 may have such a structure that a plurality of annular portions having different inner diameters are formed. Alternatively, the through-hole 61 may have such a structure that the tapered portion 62 is arranged on the downstream side. Further, the inner diameter of the annular portion 63 of the through-hole 61 is foimed to be larger than the diameter of the cylindrical portion 52 of the reduced diameter portion 50 described above so that the downstream side seal ring 60 is movable in the axial direction within a range of the reduced diameter portion 50 of the screw 20. Cutouts 67, which are inclined to be deep in the clockwise direction as viewed from the downstream side, are formed as fastening objective portions at a plurality of positions in the circumferential direction on a downstream side ring surface 66 of the downstream side seal ring 60. Accordingly, the downstream side seal ring 60 is movable in the axial direction within a range of the depth of the cutout 67 with respect to the screw 20 in accordance with the rotation state of the screw 20. When the projections 54a are engaged with the cutouts 67, any further movement of the downstream side seal ring 60 in the axial direction is regulated with respect to the screw 20.

Therefore, as shown in FIG. 2, when the downstream side seal ring 60 is moved to the downstream side with respect to the screw 20, then the tapered surface of the truncated cone portion 51 is separated from the tapered surface of the tapered portion 62, and the gap G, which serves as the passage (path) for the molten resin and the pressurized fluid, is opened between the inner circumferential surface of the downstream side seal ring 60 and the outer circumferential surface of the reduced diameter portion 50 of the screw 20. On the other hand, as shown in FIG. 3, when the downstream side seal ring 60 is moved to the upstream side with respect to the screw 20, then the tapered surface of the truncated cone portion 51 abuts against the tapered surface of the tapered portion 62, and the gap G is closed between the inner circumferential surface of the downstream side seal ring 60 and the outer circumferential surface of the reduced diameter portion 50 of the screw 20. Further, when the downstream side seal ring 60 is moved to the upstream side, and the projections 54a and the cutouts 67 are engaged with each other, then the movement of the downstream side seal ring 60 is regulated. Therefore, the downstream side seal ring 60 corotates together with the screw 20. Accordingly, the abutment state is maintained between the tapered surface of the truncated cone portion 51 and the tapered surface of the tapered portion 62 during the contact and kneading. It is possible to reliably seal the high pressure kneading zone 22. However, when the communication is made between the plasticizing zone 21 and the high pressure kneading zone 22 and between the high pressure kneading zone 22 and the pressure reduction zone 23, then a state is given, in which the tapered surfaces of the truncated cone portions 31, 51 and the tapered surfaces of the tapered portions 42, 62 are separated from each other, and the molten resin as well as the pressurized fluid is allowed to advance into the gap G from the upstream side. Therefore, when the upstream side and downstream side seal rings 40, 60 are moved to the downstream side, the tapered surfaces of the truncated cone portions 31, 51 hardly abut against the tapered surfaces of the tapered portions 42, 62, even when the upstream side and downstream side seal rings 40, 60 do not corotate together with the screw 20. Therefore, it is possible to maintain the communicated state between the high pressure kneading zone 22 and the adjoining zones 21, 23. Any arbitrary structure can be adopted for each of the fastening portions and the fastening objective portions which are provided for the screw 20 and the upstream side and downstream side seal rings 40, 60 respectively, provided that the structure enables the upstream side and downstream side seal rings 40, 60 to corotate together with the screw 20 in the rotation-prevented (stopped) state when the fastening portions and the fastening objective portions are engaged with each other. For example, a pin may be used as the fastening portion or the fastening objective portion. Further, the fastening portion may be provided on the downstream side of the second screw portion 20b and the fastening objective portion may be provided on the upstream side of the downstream side seal ring 60 in conformity with the structure of the truncated cone portion 51 and/or the tapered portion 62.

An outer seal member 70 made of metal is fitted to the outer circumferential surface of the downstream side seal ring 60 so that the outer seal member 70 protrudes from the outer circumferential surface of the downstream side seal ring 60. Accordingly, the sealing performance is secured between the downstream side seal ring 60 and the plasticizing cylinder 210. An outer seal member made of resin may be used. Further, as shown in FIG. 5, in the case of the downstream side seal ring 60 of this embodiment, the outer diameter of the upstream side ring surface 64 is formed to be larger than the diameter of the opposing second screw portion 20b disposed on the upstream side. Therefore, when the high pressure kneading zone 22 and the pressure reduction zone 23 are disconnected from each other, the downstream side seal ring 60 is arranged in such a mode that the downstream side seal ring 60 slightly protrudes from the second screw portion 20b in the radial direction on the upstream side. However, as shown in FIG. 6, the outer diameter of the upstream side ring surface 64 may be formed to be substantially the same as or smaller than the diameter of the opposing second screw portion 20b disposed on the upstream side. That is, in the high pressure kneading zone 22, the high pressure pressurized fluid is introduced from the introducing port 202. Therefore, when the outer diameter of the upstream side ring surface 64 is larger than the diameter of the opposing second screw portion 20b disposed on the upstream side (FIG. 5), then the upstream side ring surface 64, which protrudes from the screw 20, is pushed frontwardly by the pressure brought about by the pressurized fluid. Accordingly, it is possible to immediately make communication between the high pressure kneading zone 22 and the pressure reduction zone 23 by stop of the rotation of the screw 20 or decrease in the number of revolutions of the reverse rotation, without forward rotation of the screw 20. On the other hand, when the outer diameter of the upstream side ring surface 64 is substantially the same as or smaller than the diameter of the opposing second screw portion 20b disposed on the upstream side (FIG. 6), the pressure, which is brought about by the pressurized fluid, is not applied to the upstream side ring surface 64. Therefore, the high pressure kneading zone 22 and the pressure reduction zone 23 can be disconnected from each other more reliably during the contact and kneading.

The construction of the upstream side seal mechanism S1 is the same as or equivalent to that of the downstream side seal mechanism S2 described above. As shown in FIGS. 1 to 3, the reduced diameter portion 30 having the truncated cone portion (seal portion) 31 is arranged between the plasticizing zone 21 and the high pressure kneading zone 22, and projections 34a are provided on an end surface 34 of the second screw portion 20b disposed on the upstream side. An upstream side seal ring 40 is externally fitted to the reduced diameter portion 30 in a loosely fitted state so that the upstream side seal ring 40 is movable in the axial direction (front-back direction) within a range of the reduced diameter portion 30. Further, the through-hole of the upstream side seal ring 40 is formed with a tapered portion 42 which has a tapered surface (contact surface) and an annular portion 43 which has a diameter larger than the diameter of the cylindrical portion 32. Further, cutouts 47, which are engageable with the projections 34a provided on the end surface 34 of the second screw portion 20b, are formed at a plurality of positions in the circumferential direction on a downstream side ring surface 46 of the upstream side seal ring 40. Accordingly, in the same manner as the downstream side seal mechanism S2, when the upstream side seal ring 40 is moved to the downstream side with respect to the screw 20, then the tapered surface of the truncated cone portion 31 is separated from the tapered surface of the tapered portion 42, and the gap G is opened between the inner circumferential surface of the upstream side seal ring 40 and the outer circumferential surface of the reduced diameter portion 30. On the other hand, when the upstream side seal ring 40 is moved to the upstream side with respect to the screw 20, then the tapered surface of the truncated cone portion 31 abuts against the tapered surface of the tapered portion 42, and the gap G is closed between the inner circumferential surface of the upstream side seal ring 40 and the outer circumferential surface of the reduced diameter portion 30. Further, when the projections 34a and the cutouts 47 are engaged with each other, then the upstream side seal ring 40 corotates together with the screw 20.

Next, an explanation will be made about the operation of the seal mechanisms S1, S2 described above in accordance with the steps performed by the kneading apparatus 200. As shown in FIG. 2, when the screw 20 is rotated forwardly (counterclockwise), the upstream side and downstream side seal rings 40, 60 are moved to the downstream side within the ranges of the reduced diameter portions 30, 50 respectively. Accordingly, the tapered surface of the truncated cone portion 31 and the tapered surface of the tapered portion 42 are separated from each other, the gap G is opened between the inner circumferential surface of the upstream side seal ring 40 and the outer circumferential surface of the reduced diameter portion 30 of the screw 20, and the plasticizing zone 21 and the high pressure kneading zone 22 are communicated with each other. When the projections 34a and the cutouts 47 are engaged with each other, the upstream side seal ring 40 corotates together with the screw 20. Accordingly, the communicated state is maintained between the plasticizing zone 21 and the high pressure kneading zone 22. Therefore, the molten resin can be smoothly fed from the plasticizing zone 21 to the high pressure kneading zone 22.

When a certain amount of the molten resin is fed to the high pressure kneading zone 22, as shown in FIG. 3, the screw 20 is reversely rotated (clockwise) at a number of revolutions of not less than a predetermined number of revolutions by means of the rotary driving means. Accordingly, the upstream side and downstream side seal rings 40, 60 are moved to the upstream side in accordance with the reverse rotation of the screw 20. Therefore, the tapered surfaces of the truncated cone portions 31, 51 abut against the tapered surfaces of the tapered portions 42, 62. The gaps G, which have been formed between the inner circumferential surfaces of the upstream side and downstream side seal rings 40, 60 and the outer circumferential surfaces of the reduced diameter portions 30, 50, are closed. When the projections 34a, 54a of the screw 20 are engaged with the cutouts 47, 67 of the upstream side and downstream side seal rings 40, 60, the upstream side and downstream side seal rings 40, 60 corotate together with the screw 20. Accordingly, the disconnected (shut off) state is maintained between the high pressure kneading zone 22 and the pressure reduction zone 23. Therefore, even when the high pressure pressurized fluid is introduced into the high pressure kneading zone 22, the molten resin and the pressurized fluid are prevented from flowing into the adjoining zones 21, 23 from the high pressure kneading zone 22. The molten resin and the pressurized fluid can be brought in contact and kneaded with each other at a high pressure.

When the high pressure kneading zone 22 and the adjoining zones 21, 23 are sealed by the upstream side and downstream side seal mechanisms S1, S2 so that the molten resin and the pressurized fluid are brought in contact and kneaded with each other, the screw 20 is subsequently rotated forwardly again by means of the rotary driving means in order to lower the resin internal pressure of the molten resin. Accordingly, the projections 34a, 54a are disengaged from the cutouts 47, 67, and the upstream side and downstream side seal rings 40, 60 are moved to the downstream side in accordance with the forward rotation of the screw 20. Therefore, the tapered surfaces of the truncated cone portions 31, 51 are separated from the tapered surfaces of the tapered portions 42, 62, and the gaps G are opened between the inner circumferential surfaces of the upstream side and downstream side seal rings 40, 60 and the outer circumferential surfaces of the reduced diameter portions 30, 50. Accordingly, the high pressure kneading zone 22 and the pressure reduction zone 23 are communicated with each other, and the resin internal pressure of the molten resin is lowered. Therefore, the gasified pressurized fluid is separated from the molten resin, and the gasified pressurized fluid can be discharged from the vent 203 provided in the pressure reduction zone 23. As described above, the downstream side seal ring 60 receives the pressure from the molten resin and the pressurized fluid after the molten resin and the pressurized fluid are brought in contact and kneaded with each other in the high pressure kneading zone 22. Therefore, the high pressure kneading zone 22 and the pressure reduction zone 23 can be communicated with each other as well by stopping the rotation of the screw 20 or lowering the number of revolutions of the reverse rotation of the screw 20.

As described above, in this embodiment, the contact and kneading of the pressurized fluid and the separation from the molten resin can be also repeatedly performed in a state in which the molten resin is allowed to stay in the high pressure kneading zone 22. For example, the following operation may be performed. That is, the number of revolutions of the screw 20 is controlled in a state in which the molten resin is not fed frontwardly while reversely rotating the screw 20, the tapered surface of the truncated cone portion 51 and the tapered surface of the tapered portion 62 are separated from each other, and thus the gap. G is slightly opened. Accordingly, the pressurized fluid can be brought in contact with the molten resin in the high pressure kneading zone 22 again, and the pressurized fluid can be further introduced into the molten resin. Furthermore, when the pressure of the high pressure kneading zone 22 is higher than the resin internal pressure in the plasticizing zone 21, the upstream side seal mechanism S1 is easily movable in the direction in which the plasticizing zone 21 and the high pressure kneading zone 22 are disconnected (shut off) from each other. Therefore, any renewed flow of the molten resin, which is directed from the plasticizing zone 21 to the high pressure kneading zone 22, is suppressed. Further, it is also possible to avoid any leakage of the pressurized fluid to the plasticizing zone 21.

<Molding Method>

Figure 9:
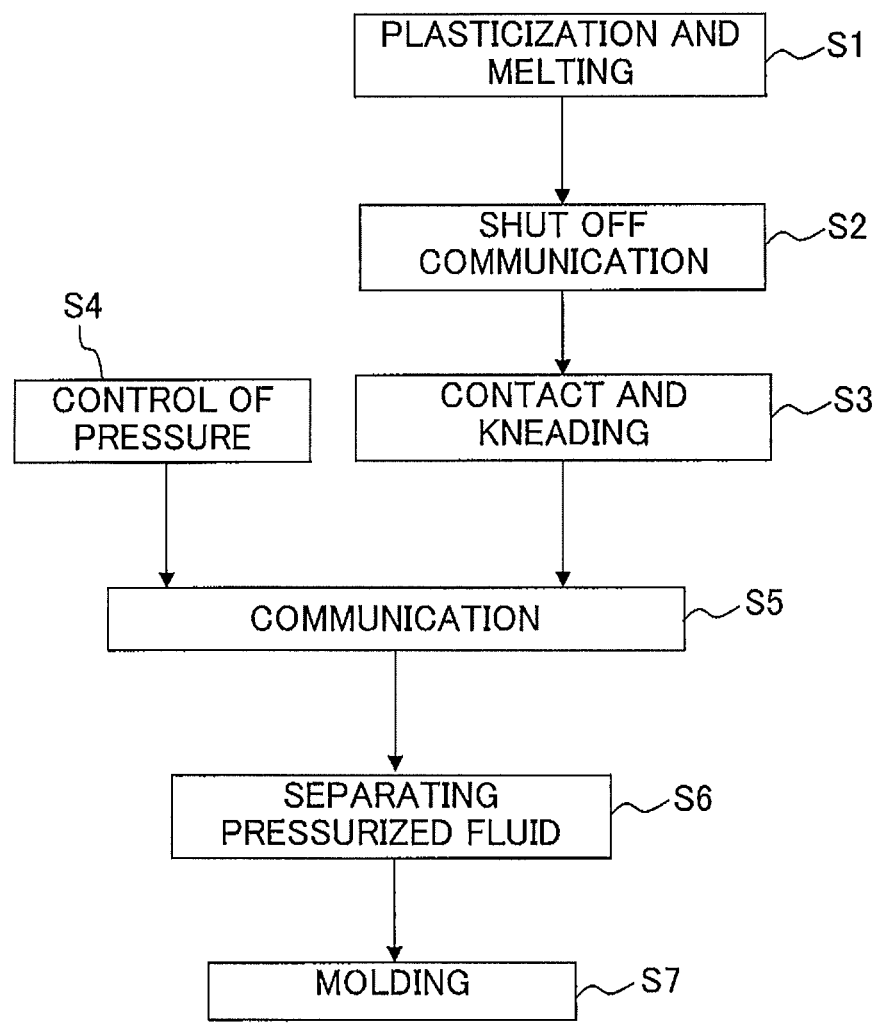
FIG. 9 shows a flow chart illustrating a production method for producing a thermoplastic resin molded product according to the first embodiment.

Next, an explanation will be made about a production method for producing a thermoplastic resin molded product by using the kneading apparatus 200 of this embodiment in accordance with a flow chart shown in FIG. 9. In the production method for producing the thermoplastic resin molded product of this embodiment, the thermoplastic resin is firstly supplied to the plasticizing cylinder 210, and the screw 20 is rotated. Accordingly, the thermoplastic resin is plasticized in the plasticizing zone 21 to provide the molten resin (Step S1).

Various resins can be used as the thermoplastic resin depending on the type of the objective molded product. Specifically, it is possible to use, for example, thermoplastic resins including, for example, polypropylene, polymethyl methacrylate, polyamide, polycarbonate, amorphous polyolefin, polyether imide, polyethylene terephthalate, polyether ether ketone, ABS-based resin, polyphenylene sulfide, polyamide imide, polylactic acid, and polycaprolactone, and composite materials thereof. Further, it is also possible to use those obtained by kneading various inorganic fillers such as glass fiber, talc, carbon fiber and the like with the thermoplastic resin as described above.

Subsequently, the plasticized molten resin is successively fed from the plasticizing zone 21 to the high pressure kneading zone 22 in accordance with the forward rotation of the screw 20, and the communication between the high pressure kneading zone 22 and the pressure reduction zone 23 is shut off by means of the downstream side seal mechanism S2 (Step S2). In this embodiment, the upstream side seal mechanism S1 is simultaneously used to perform the disconnection between the plasticizing zone 21 and the high pressure kneading zone 22 as well. Further, the pressurized fluid is introduced into the high pressure kneading zone 22, and the molten resin and the pressurized fluid are brought in contact and kneaded with each other in the high pressure kneading zone 22 (Step S3). In the kneading apparatus 200 of this embodiment, the molten resin and the pressurized fluid can be brought in contact and kneaded with each other in the state in which the communication between the high pressure kneading zone 22 and the adjoining zones 21, 23 is shut off by the upstream side and downstream side seal mechanisms S1, S2. Therefore, the leakage of the pressurized fluid from the high pressure kneading zone 22 is suppressed, and the pressurized fluid can be introduced into the molten resin while maintaining the high pressure state. The pressure and the temperature of the high pressure kneading zone 22, which are to be provided upon the contact and kneading, can be appropriately selected within a range in which the pressurized fluid is satisfactorily dispersed in the molten resin, depending on the types of the thermoplastic resin and the pressurized fluid to be used.

As for the pressurized fluid, it is possible to use pressurized carbon dioxide or pressurized nitrogen in a liquid state, a gas state, or a supercritical state. The pressurized fluid as described above is harmless to the human body, excellent in the dispersibility in the molten resin, and easily removable from the molten resin. Further, the pressurized fluid functions as a plasticizer for the molten resin. In this embodiment, the molded product may be foamed. In this case, the pressurized fluid as described above functions as a physical foaming agent. In this embodiment, pressurized carbon dioxide is used as the pressurized fluid, and the functional material is further contained in pressurized carbon dioxide. When the functional material is contained, it is preferable that pressurized carbon dioxide is used as the pressurized fluid. In the following description, the pressurized fluid containing the functional material is referred to as "mixture pressurized fluid", if necessary.

The pressure and the temperature of the pressurized fluid introduced into the plasticizing screw 210 are arbitrary. However, it is preferable to use the pressurized fluid in the liquid state or the pressurized fluid in the supercritical state, because the density is high and the state is stable. When pressurized carbon dioxide is used as the pressurized fluid, it is preferable that the temperature of pressurized carbon dioxide is within a range of 5° C. to 50° C. The lower the temperature of pressurized carbon dioxide is, the higher the density is, wherein the solvent effect is enhanced, which is preferred. However, it is preferable that the temperature of pressurized carbon dioxide is not less than 5° C., in view of the fact that the cooling control is easy. When the temperature of pressurized carbon dioxide is raised, then the density is lowered, and it is feared that the liquid feeding may be unstable. Therefore, it is preferable that the temperature of pressurized carbon dioxide is not more than 50° C., in view of the fact that the liquid is fed stably. It is desirable that the pressure of pressurized carbon dioxide is within a range of 4 to 25 MPa. If the pressure is low, the solvent effect is hardly expressed. Therefore, it is preferable that the pressure is not less than 4 MPa, in view of the fact that the solvent effect is obtained to an appropriate extent. On the other hand, if the pressure is high, the cost is required to maintain the high pressure equipment. Therefore, it is preferable that the pressure is not more than 25 MPa, in view of the fact that the cost is suppressed. In this embodiment, pressurized carbon dioxide, in which the functional material is dissolved, instantaneously has a high temperature in the plasticizing cylinder 210, and the pressure varies or fluctuates as well. Therefore, the state, the temperature, and the pressure of pressurized carbon dioxide described above correspond to the values of the state, the pressure, and the temperature of pressurized carbon dioxide in the stable state before being introduced into the plasticizing cylinder 210.

The functional material is not specifically limited, provided that the functional material can be dissolved or dispersed in the pressurized fluid and the functional material can apply a predetermined function to the obtained molded product. The functional material as described above is exemplified, for example, by organic metal complexes, inorganic particles such as metal alkoxide or the like or precursors thereof, carbon fibers, inorganic fillers such as glass fibers or modified compounds thereof, compatibility-providing agents for facilitating alloy formation of various resins, surfactants, dyes, nanocarbon, antistatic agents, and incombustible materials (refractory materials). The concentration of the functional material in the pressurized fluid can be appropriately selected in consideration of the type of the functional material to be used and the function of the objective molded product, which is not specifically limited. However, the concentration is preferably not more than the saturated solubility in consideration of the permeation performance into the molten resin and the aggregation of the functional material in the mixture pressurized fluid. In particular, the density of the pressurized fluid is suddenly lowered in the plasticizing cylinder of the molding machine having a high temperature. Therefore, the concentration of the functional material in the pressurized fluid is preferably about 1 to 50% of the saturated solubility.

The pressurized fluid itself functions as a plasticizer for the molten resin even at a low pressure. However, in order to facilitate the plasticizing effect, it is also appropriate to use a plasticizer and various solvents such as alcohol and the like. The pressurized fluid may further contain a solvent. For example, it is possible to use the pressurized fluid which is obtained as an emulsified liquid (emulsion) by using water together with the pressurized fluid and a water-soluble surfactant. The material, which is dissolvable in the pressurized fluid, is limited. Therefore, when the solvent as described above is used, a water-soluble material can be introduced into the molten resin by utilizing the compatibility and the dispersibility with respect to the resin possessed by the pressurized fluid. If only water is brought in contact and kneaded with the molten resin, it is feared that any harmful influence such as hydrolysis or the like may be caused by water remaining in the molded product. However, when water is introduced into the molten resin in a form of emulsion together with the pressurized fluid, then water can be quickly separated from the molten resin together with the pressurized fluid, and it is possible to avoid the harmful influence as described above. Further, the mixture pressurized fluid may contain a solvent which dissolves the functional material. For example, when an organic metal complex is used, a fluorine-based organic solvent such as perfluoropentylamine or the like may be used in order to raise the concentration of the organic metal complex in the mixture pressurized fluid.

The method for preparing the pressurized fluid is not specifically limited, and it is possible to use any conventionally known method. For example, the pressurized fluid can be prepared by pressurizing any liquid pressurized fluid by means of any pressurizing means such as a syringe pump or the like. When the pressurized fluid (mixture pressurized fluid) containing the functional material is prepared, the pressurized fluid (mixture pressurized fluid) can be prepared by mixing and agitating the pressurized fluid and the functional material. Further, when a solution, in which the functional material is dissolved in a solvent, is used, the mixture pressurized fluid can be prepared by mixing the pressurized fluid with the solution pressurized to a predetermined pressure by means of any pressurizing means.

Any arbitrary method can be used as the method for supplying the mixture pressurized fluid to the high pressure kneading zone 22. For example, the mixture pressurized fluid may be intermittently introduced into the high pressure kneading zone 22, or the mixture pressurized fluid may be continuously introduced. When the mixture pressurized fluid is introduced, it is preferable that a syringe pump, which makes it possible to perform the stable liquid feeding, is utilized to control the amount of introduction. When the mixture pressurized fluid is introduced by using the syringe pump, the pressurized fluid, which is in a stable liquid state even in the case of a high density, is preferably used.

On the other hand, when the high pressure kneading zone 22 and the pressure reduction zone 23 are disconnected from each other, the pressure of the pressure reduction zone 23 is controlled so that the pressure is not less than the atmospheric pressure and the pressure is not more than the maximum pressure of the high pressure kneading zone 22 which is achieved when the pressurized fluid is brought in contact and kneaded with the molten resin (Step S4). As described above, in this embodiment, the pressure of the pressure reduction zone 23 is adjusted by the pressure reduction zone pressure adjusting mechanism 219 having the discharge mechanism 1 and the pressurizing mechanism 2. Therefore, in this embodiment, the pressure of the gas in the pressure reduction zone 23 is controlled by using the pressure reduction zone pressure adjusting mechanism 219. When the pressure of the pressure reduction zone 23 is controlled as described above, it is possible to stably control, for every shot, the amount of the pressurized fluid to be introduced into the plasticizing cylinder 210.

The pressure in the pressure reduction zone 23, which is provided when the high pressure kneading zone 22 and the pressure reduction zone 23 are disconnected from each other, is not specifically limited, provided that the pressure is not less than the atmospheric pressure and the pressure is not more than the maximum achieved pressure of the high pressure kneading zone 22. However, the pressure is preferably 0.5 to 6 MPa. For example, when the functional material is modified (changed in quality) due to the thermal decomposition, the dehydration condensation reaction or the like in the plasticizing cylinder 210, and the functional material becomes insoluble in the solvent and the pressurized fluid, then the pressure may be set to be relatively high, i.e., 6 to 20 MPa. The pressure of the pressure reduction zone 22 may be set to be relatively high, and the molded product may be foamed. Further, it is preferable that the pressure in the pressure reduction zone 23, which is provided when the high pressure kneading zone 22 and the pressure reduction zone 23 are disconnected from each other, is controlled to be a constant pressure, in view of the fact that the pressure in the plasticizing cylinder 210 is further stabilized.

Subsequently, the high pressure kneading zone 22 and the pressure reduction zone 23 are communicated with each other (Step S5) to lower the resin internal pressure of the molten resin which is brought in contact and kneaded with the mixture pressurized fluid, and thus the gasified pressurized fluid (carbon dioxide) is separated from the molten resin (Step S6). In this embodiment, the seal mechanism S2 is used, which makes communication between the high pressure kneading zone 22 and the pressure reduction zone 23 in accordance with the rotation state of the screw 20. Therefore, the pressurized fluid contained in the mixture pressurized fluid introduced into the molten resin can be quickly gasified without depending on the pressure of the high pressure kneading zone 22, and the gasified pressurized fluid can be discharged to the outside of the plasticizing cylinder 210.

When the gasified pressurized fluid is separated from the molten resin, the pressurized fluid may be separated while feeding the molten resin to the pressure reduction zone 23. Alternatively, the pressurized fluid may be separated in such a state that the molten resin is allowed to stay in the high pressure kneading zone 22. That is, in the kneading apparatus 200 of this embodiment, the downstream side seal mechanism S2 is provided, which makes communication and disconnection between the high pressure kneading zone 22 and the pressure reduction zone 23 in accordance with the rotation state of the screw 20. Therefore, even when the molten resin is not fed to the pressure reduction zone 23, the resin internal pressure of the molten resin can be lowered in the state in which the molten resin is allowed to stay in the high pressure kneading zone 22 on condition that the high pressure kneading zone 22 and the pressure reduction zone 23 are communicated with each other. Part of the pressurized fluid in the high pressure kneading zone 22 is gasified thereby, and the gasified pressurized fluid can be discharged from the pressure reduction zone 23. For example, the following procedure is appropriately performed. That is, the screw 20 is reversely rotated to control the number of revolutions of the screw 20 in a state in which the molten resin is not fed frontwardly, the tapered surface of the truncated cone portion 51 and the tapered surface of the tapered portion 62 are separated from each other, and thus the gap G is slightly opened. Accordingly, the pressurized fluid can be brought in contact with the molten resin in the high pressure kneading zone 22 having a lowered concentration of the pressurized fluid again, and the pressurized fluid can be further introduced into the molten resin. Further, when the pressure of the high pressure kneading zone 22 is higher than the resin internal pressure in the plasticizing zone 21, the upstream side seal mechanism S1 is easily moved in the direction in which the plasticizing zone 21 and the high pressure kneading zone 22 are disconnected from each other. Therefore, any new flow of the molten resin, which is directed from the plasticizing zone 21 to the high pressure kneading zone 22, is suppressed, and it is also possible to avoid the leakage of the pressurized fluid to the plasticizing zone 21. Therefore, according to the production method based on the use of the kneading apparatus 200 of this embodiment, the kneading step and the separating step can be repeatedly performed in the state in which the molten resin is allowed to stay in the high pressure kneading zone 22. Accordingly, for example, it is possible to obtain a thermoplastic resin molded product in which the functional material is dispersed at a high concentration even in the case of the functional material having a low solubility in the pressurized fluid (pressurized carbon dioxide). In this procedure, as described above, the forward rotation and the reverse rotation of the screw 20 may be repeated bit by bit in order to repeat the communication and the disconnection between the high pressure kneading zone 22 and the pressure reduction zone 23. Alternatively, it is also allowable to repeat, bit by bit, the reverse rotation of the screw 20 at a number of revolutions of not less than a predetermined number of revolutions and the stop of the rotation of the screw 20 or the decrease in the number of revolutions of the reverse rotation of the screw 20.

When the gasified pressurized fluid is separated from the molten resin, the temperature of the pressure reduction zone 23 may be controlled to a temperature lower than those of the other zones. Accordingly, the viscosity of the molten resin is raised, and it is possible to suppress the vent up. In this embodiment, the cooling is performed for the pressure reduction zone 23, and the molten resin is allowed to be in a semi-solidified state.

When the gasified pressurized fluid is separated from the molten resin, the molten resin is fed to the remelting zone 24 positioned on the downstream from the pressure reduction zone 23. In this embodiment, the resin in the semi-solidified state is heated and remelted in the remelting zone 24. Subsequently, the molten resin is injected from the forward end portion of the plasticizing cylinder 210, and the molten resin is molded to have a desired shape (Step S7). In this embodiment, it is possible to use any conventionally known injection molding method and any conventionally known extrusion molding method depending on the type of the objective molded product. When the injection molding method is utilized, the thermoplastic resin molded product can be produced such that the screw 20 is moved frontwardly by means of moving means connected to the back end portion of the plasticizing cylinder 210 after completing the plasticization and weighing, and the molten resin is injected and charged into a mold having a predetermined internal shape. On the other hand, when the extrusion molding method is utilized, the molded product, which has a shape of, for example, a pellet shape, a tube shape, a sheet shape or the like, can be produced such that the molten resin is injected from the plasticizing cylinder 210 into an extrusion die having a predetermined internal shape.

Second Embodiment

In a second embodiment, an explanation will be made about a kneading apparatus in which a physical foaming agent is kneaded with a molten resin in a plasticizing cylinder and a part of the physical foaming agent is discharged, and a production method for producing a molded product (foamed molded product) having foamed cells by using the kneading apparatus, i.e., a foam injection molding method.

<Kneading Apparatus>

Figure 10:
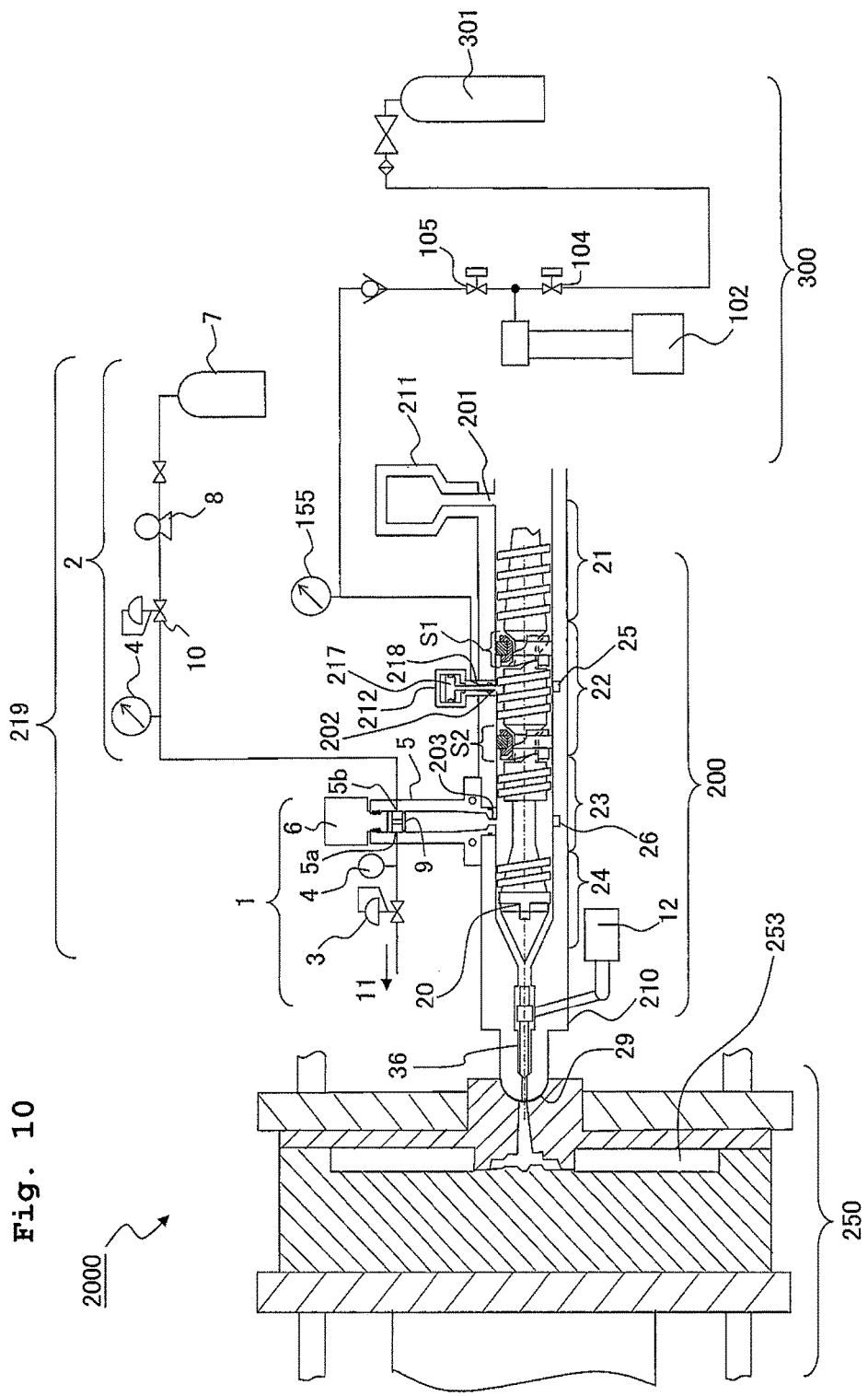
FIG. 10 shows a schematic sectional view illustrating an exemplary molding machine to carry out a foam injection molding method according to the second embodiment.

In this embodiment, the kneading apparatus 200 is used, which has the same structure as that of the first embodiment. As shown in FIG. 10, the kneading apparatus 200 is provided for a molding machine 2000. The molding machine 2000 has the same structure as that of the molding machine 1000 shown in FIG. 1 used in the first embodiment, except that a physical foaming agent supply apparatus 300 is provided in place of the pressurized fluid supply apparatus 100. The right is defined as "upstream" or "backward", and the left is defined as "downstream" or "forward (frontward)" at the inside of the plasticizing cylinder 210 shown in FIG. 10 in the same manner as in the first embodiment.

<Molding Method>

Figure 13:
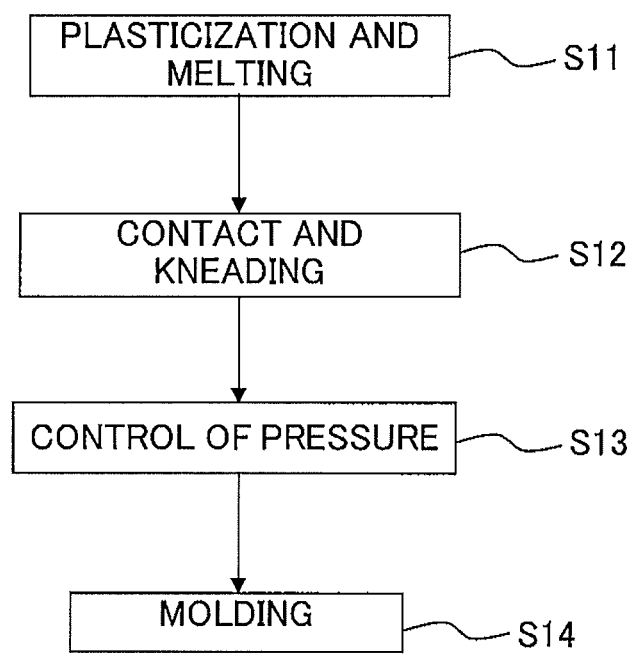
FIG. 13 shows a flow chart illustrating the foam injection molding method according to the second embodiment.

An explanation will be made about the foam injection molding method based on the use of the molding machine 2000 shown in FIG. 10 in accordance with a flow chart shown in FIG. 13. At first, the thermoplastic resin is supplied to the plasticizing cylinder 210, and the screw 20 is rotated. Accordingly, the thermoplastic resin is plasticized in the plasticizing zone 21 to provide the molten resin (Step S11). The thermoplastic resin, which is the same as or equivalent to that used in the first embodiment, can be used as the thermoplastic resin.

Subsequently, the molten resin and the physical foaming agent are brought in contact and kneaded with each other (Step S12). In this embodiment, the plasticized molten resin is successively fed from the plasticizing zone 21 to the high pressure kneading zone 22 in accordance with the forward rotation of the screw 20, and the communication between the high pressure kneading zone 22 and the pressure reduction zone 23 is shut off by means of the downstream side seal mechanism S2. Simultaneously, the upstream side seal mechanism 51 is used to perform the disconnection between the plasticizing zone 21 and the high pressure kneading zone 22 as well. In this way, the physical foaming agent is introduced into the high pressure kneading zone 22 in the state in which the high pressure kneading zone 22 is shut off from the plasticizing zone 21 and the pressure reduction zone 23, and the physical foaming agent is brought in contact and kneaded with the molten resin.

In this embodiment, the molten resin and the physical foaming agent are brought in contact and kneaded with each other in the state in which the communication between the high pressure kneading zone 22 and the adjoining zones 21, 23 is shut off by the upstream side and downstream side seal mechanisms 51, S2. Therefore, the leakage of the physical foaming agent from the high pressure kneading zone 22 is suppressed. The physical foaming agent can be introduced into the molten resin while maintaining the high pressure state. The pressure and the temperature of the high pressure kneading zone 22, which are to be provided upon the contact and kneading, can be appropriately selected within a range in which the physical foaming agent is satisfactorily dispersed in the molten resin, depending on the types of the thermoplastic resin and the physical foaming agent to be used.

It is preferable that the pressurized fluid, which includes, for example, pressurized nitrogen and pressurized carbon dioxide, is used as the physical foaming agent. Appropriate conditions differ depending on the type of the foaming agent as well, which is arbitrary in relation to the introducing pressure and the temperature of the physical foaming agent to be introduced into the plasticizing cylinder 210. However, it is preferable to provide the liquid state or the supercritical state, because the density is high and the state is stable. When pressurized nitrogen or pressurized carbon dioxide is used as the physical foaming agent, it is preferable that the pressure is 3 to 25 MPa and the temperature is 10° C. to 100° C. When the pressure is not less than 3 MPa, the physical foaming agent can be stably introduced into the plasticizing cylinder 210. When the pressure is not more than 25 MPa, the load on the apparatus is decreased. When the temperature is within the range of 10° C. to 100° C., the physical foaming agent is easily controlled in the system. As for pressurized nitrogen and pressurized carbon dioxide used as the physical foaming agent in this embodiment, the temperature instantaneously becomes high in the plasticizing cylinder 210, and the pressure varies or fluctuates as well. Therefore, the state, the temperature, and the pressure of the physical foaming agent described above correspond to the values of the state, the pressure, and the temperature of the physical foaming agent in the stable state before being introduced into the plasticizing cylinder 210.

The method for preparing the physical foaming agent is not specifically limited, for which it is possible to use any conventionally known method. In this embodiment, as shown in FIG. 10, the physical foaming agent supply apparatus 300 is used, which is provided with a syringe pump such as a syringe or injector for sucking the physical foaming agent and performing liquid feeding. The physical foaming agent supply apparatus 300 is constructed by a physical foaming agent bomb 301 of the siphon type, and the syringe pump 102 which sucks, pressurizes, and liquefy the physical foaming agent from the bomb 301 and which supplies the liquefied physical foaming agent. The pressure control and the flow rate control can be performed for the syringe pump 102. An air operate valve for suction 104 and an air operate valve for supply 105 are arranged for a piping for connecting the physical foaming agent bomb 301 and the syringe pump 102 and a piping for connecting the syringe pump 102 and the plasticizing cylinder 210 respectively.

Any arbitrary method can be used as the method for supplying the physical foaming agent to the high pressure kneading zone 22. For example, the physical foaming agent may be intermittently introduced into the high pressure kneading zone 22, or the physical foaming agent may be continuously introduced. When the physical foaming agent is introduced, it is preferable that a syringe pump, which makes it possible to perform the stable liquid feeding, is utilized to control the amount of introduction.

As described later on, in this embodiment, the pressure of the molten resin brought in contact and kneaded with the physical foaming agent is controlled before the injection so that the concentration of the physical foaming agent in the molten resin approaches the saturated solubility. Therefore, the control is performed in relation to the concentration of the physical foaming agent in the molten resin in the following step. Therefore, it is also allowable that the amount of introduction of the physical foaming agent is not strictly controlled at the stage of introduction into the high pressure kneading zone 22. Further, the concentration of the physical foaming agent in the molten resin can be allowed to approach the saturated solubility. Therefore, it is also unnecessary that the physical foaming agent, which is to be introduced into the molten resin, unnecessarily has a high pressure. In the case of any conventional foam injection molding method, the high pressure physical foaming agent is weighed to quantitatively supply the same into the plasticizing cylinder. Therefore, the apparatus is complicated and the cost is increased, which prohibits the widespread use of the foam injection molding. On the contrary, in the injection molding method of this embodiment, the physical foaming agent in the bomb 151 may be directly introduced into the plasticizing cylinder 210 without being pressurized and without performing the flow rate control, for example, as in a physical foaming agent supply apparatus 400 shown in FIG. 11. When the physical foaming agent supply apparatus 400, which has no pressurizing unit or apparatus as described above, is used, it is possible to realize the low cost of the entire molding machine.

Subsequently, the pressure of the molten resin brought in contact and kneaded with the physical foaming agent is controlled to be not more than the maximum pressure which is achieved when the physical foaming agent is brought in contact and kneaded with the molten resin, by adjusting the pressure of the atmosphere of the molten resin so that the concentration of the physical foaming agent in the molten resin approaches the saturated solubility (Step S13). The phrase "concentration of the physical foaming agent in the molten resin approaches the saturated solubility" means that the ratio of the actual concentration of the physical foaming agent with respect to the saturated solubility in the state provided after controlling the pressure is higher when the ratio of the actual concentration of the physical foaming agent with respect to the saturated solubility of the physical foaming agent in the molten resin in the state provided before controlling the pressure is compared with the ratio of the actual concentration of the physical foaming agent with respect to the saturated solubility of the physical foaming agent in the molten resin in the state provided after controlling the pressure. The molten resin, in which the physical foaming agent is contained at a high concentration approximate to the saturated solubility, arrives at the supersaturation in a high pressure region when the molten resin is injected and charged into the mold, wherein many foaming nuclei are generated or produced. Accordingly, it is possible to raise the foaming density of the foamed molded product. Further, the concentration of the physical foaming agent in the molten resin is controlled before the injection. Therefore, it is also allowable that the amount of introduction of the physical foaming agent into the molten resin is not strictly controlled.

The phrase "maximum pressure which is achieved when the physical foaming agent is brought in contact and kneaded" means the maximum (highest) pressure (maximum achieved pressure or maximum reached pressure) which is achieved or reached during the contact and kneading with the physical foaming agent, while the pressure of the molten resin is raised when the physical foaming agent, which is pressurized nitrogen or pressurized carbon dioxide, is introduced into the molten resin. The phrase "pressure of the atmosphere of the molten resin" means the pressure of the gaseous phase in the space to which the molten resin belongs, or the pressure of the gas which exists around the molten resin. In this embodiment, the pressure of the atmosphere of the molten resin is the pressure in the plasticizing cylinder 210, which is principally the pressure of the gas provided by gasifying the physical foaming agent supplied into the plasticizing cylinder 210. If the pressure of the molten resin, which is provided after kneading the physical foaming agent, is lowered (controlled) by means of the resin pressure of the back pressure, the risk is generated to cause the phase separation between the resin and the gas as the physical foaming agent. On the other hand, in this embodiment, this problem does not arise, because the pressure of the molten resin is controlled by controlling the gas pressure around the molten resin, i.e., the gas pressure of the physical foaming agent itself.

In this embodiment, the concentration of the physical foaming agent in the molten resin can be allowed to approach the saturated solubility by controlling the pressure of the molten resin brought in contact and kneaded with the physical foaming agent so that the pressure is not less than the atmospheric pressure and the pressure is not more than the maximum pressure which is achieved when the physical foaming agent is brought in contact and kneaded with the molten resin and separating a part of the gasified physical foaming agent from the molten resin. As for the saturated solubility (saturated concentration) of pressurized nitrogen or pressurized carbon dioxide to serve as the physical foaming agent with respect to the molten resin, the higher the pressure is, the higher the saturated solubility (saturated concentration) is, while the lower the pressure is, the lower the saturated solubility (saturated concentration) is. Therefore, when the pressure of the molten resin is reduced to be not more than the maximum pressure which is achieved during the contact and kneading after allowing the physical foaming agent to be brought in contact and kneaded with the molten resin while maintaining the high pressure state as described above, then the saturated solubility is also lowered as the pressure is lowered. Therefore, the concentration of the physical foaming agent can be allowed to approach the saturated solubility without raising the absolute amount of the physical foaming agent in the resin. In this procedure, any surplus physical foaming agent, which is contained in the molten resin, is gasified and separated from the molten resin, and the excessive physical foaming agent is discharged from the pressure reduction zone 23. Even when the physical foaming agent is introduced in an excessive amount, the physical foaming agent is brought in contact and kneaded with the molten resin, while the surplus physical foaming agent is separated from the molten resin, and the surplus physical foaming agent is progressively discharged from the pressure reduction zone 23. Therefore, a merit is obtained such that a large amount of the physical foaming agent can be kneaded in the high pressure kneading zone 22 as compared with any conventional method. In this embodiment, the physical foaming agent, which is separated from the molten resin during the contact and kneading, can be previously discharged in the pressure reduction zone, and only the molten resin, which is in the homogeneous or uniform compatibly dissolved state, can be fed frontwardly. Therefore, it is possible to suppress the phase separation between the molten resin and the physical foaming agent.

The pressure of the molten resin brought in contact and kneaded with the physical foaming agent can be controlled to be any arbitrary pressure provided that the pressure is not less than the atmospheric pressure and the pressure is not more than the maximum achieved pressure provided when the physical foaming agent is brought in contact and kneaded. The reason, why the pressure of the molten resin is not less than the atmospheric pressure, is as follows. That is, if the gas discharge is forcibly performed to be less than the atmospheric pressure, it is feared that the molten resin may cause the vent up. Further, any equipment such as a vacuum pump or the like is required, which results in the high cost. The reason, why the pressure is not more than the maximum achieved pressure provided when the physical foaming agent is brought in contact and kneaded, is as follows. That is, it is possible to allow the concentration of the physical foaming agent to approach the saturated solubility as described above. It is preferable that the pressure of the molten resin brought in contact and kneaded with the physical foaming agent is controlled to be within a range of is 3 to 20 MPa. When the pressure of the molten resin is not less than 3 MPa, then the satisfactory foamed product is easily obtained, and it is possible to decrease the differential pressure with respect to the physical foaming agent introduced into the molten resin. Therefore, it is possible to suppress the pressure fluctuation associated with the pressure control of the molten resin. On the other hand, when the pressure of the molten resin is not more than 20 MPa, it is possible to decrease the load exerted on the apparatus.

The control of the pressure of the molten resin brought in contact and kneaded with the physical foaming agent as described above (Step S13) is performed in accordance with a method explained below, in the kneading apparatus 200 shown in FIG. 10. At first, the pressurized physical foaming agent is introduced into the high pressure kneading zone 22, and the physical foaming agent is brought in contact and kneaded with the molten resin in the state in which the high pressure kneading zone 22 is shut off from the plasticizing zone 21 and the pressure reduction zone 23 as described above (Step S12). Concurrently therewith, the gas pressure in the pressure reduction zone 23 is controlled so that the gas pressure is not less than the atmospheric pressure and the gas pressure is not more than the maximum pressure which is achieved when the physical foaming agent is brought in contact and kneaded with the molten resin, in the state in which the communication between the high pressure kneading zone 22 and the pressure reduction zone 23 is shut off. The high pressure kneading zone 22 and the pressure reduction zone 23 are communicated with each other. When the high pressure kneading zone 22 and the pressure reduction zone 23 are communicated with each other, the pressure of the high pressure kneading zone 22 is lowered to the pressure of the pressure reduction zone 23. Therefore, the pressure of the molten resin containing the physical foaming agent in the plasticizing cylinder 210 is also lowered to the pressure of the pressure reduction zone 23. In this situation, any surplus physical foaming agent contained in the molten resin is gasified, and the excessive physical foaming agent is separated from the molten resin. As a result, the concentration of the physical foaming agent in the molten resin can be allowed to approach the saturated solubility.

In this embodiment, the pressure of the pressure reduction zone 23 is controlled by the pressure reduction zone pressure adjusting mechanism 219. The pressure reduction zone pressure adjusting mechanism 219 controls the pressure of the pressure reduction zone so that the pressure is not less than the atmospheric pressure and the pressure is not more than the maximum pressure of the high pressure kneading zone 22 which is achieved when the physical foaming agent is brought in contact and kneaded with the molten resin, when the communication between the high pressure kneading zone 22 and the pressure reduction zone 23 is shut off by means of the downstream side seal mechanism S2 described above.

The pressure of the pressure reduction zone 23, which is provided in such a state that the high pressure kneading zone 22 and the pressure reduction zone 23 are disconnected from each other, may be any arbitrary pressure, provided that the pressure is not less than the atmospheric pressure and the pressure is not more than the maximum achieved pressure of the high pressure kneading zone 23. However, it is preferable that the pressure is within a range of 3 to 20 MPa.

As explained above, the pressure reduction zone pressure adjusting mechanism 219 controls the pressure of the pressure reduction zone 23 so that the pressure is not less than the atmospheric pressure and the pressure is not more than the maximum achieved pressure of the high pressure kneading zone 22. Accordingly, the concentration of the physical foaming agent in the molten resin can be allowed to approach the saturated solubility. An effect is further obtained such that the amount of the physical foaming agent introduced into the plasticizing cylinder 210 can be stably controlled for every shot. The reason thereof will be explained below with reference to FIGS. 8 and 12 while making comparison with a conventional kneading apparatus.

As described above, when the physical foaming agent is introduced into the high pressure kneading zone 22, the high pressure kneading zone 22 is disconnected from the pressure reduction zone 23. As shown in FIG. 8, when the physical foaming agent is introduced after disconnecting the high pressure kneading zone 22 from the pressure reduction zone 23, the pressure of the high pressure kneading zone 22 is raised. After a predetermined period of time elapses, the high pressure kneading zone 22 is communicated with the pressure reduction zone 23 again. Accordingly, the pressure of the high pressure kneading zone 22 is lowered to the pressure of the pressure reduction zone 23. The cycle, in which the pressure of the high pressure kneading zone 22 is raised and lowered, is repeated for every shot.

In the conventional physical foaming molding method, such a screw has been used that the resin pressure is transmitted from the forward end portion of the screw to the position at which the high pressure physical foaming agent such as a supercritical fluid or the like is introduced. Further, the internal pressure of the introducing portion is controlled by the back pressure of the screw, assuming that all of the back pressure, the pressure of the molten resin deposited at the forward end of the screw, and the pressure of the molten resin disposed at the introducing portion of the high pressure physical foaming agent are equal to one another. However, the resin internal pressure at the introducing portion of the high pressure physical foaming agent is actually different from the back pressure, for example, because the physical foaming agent is not kneaded at a uniform concentration over the entire screw. Therefore, the amount of introduction of the high pressure physical foaming agent into the plasticizing cylinder has been varied or fluctuated.

Figure 12:
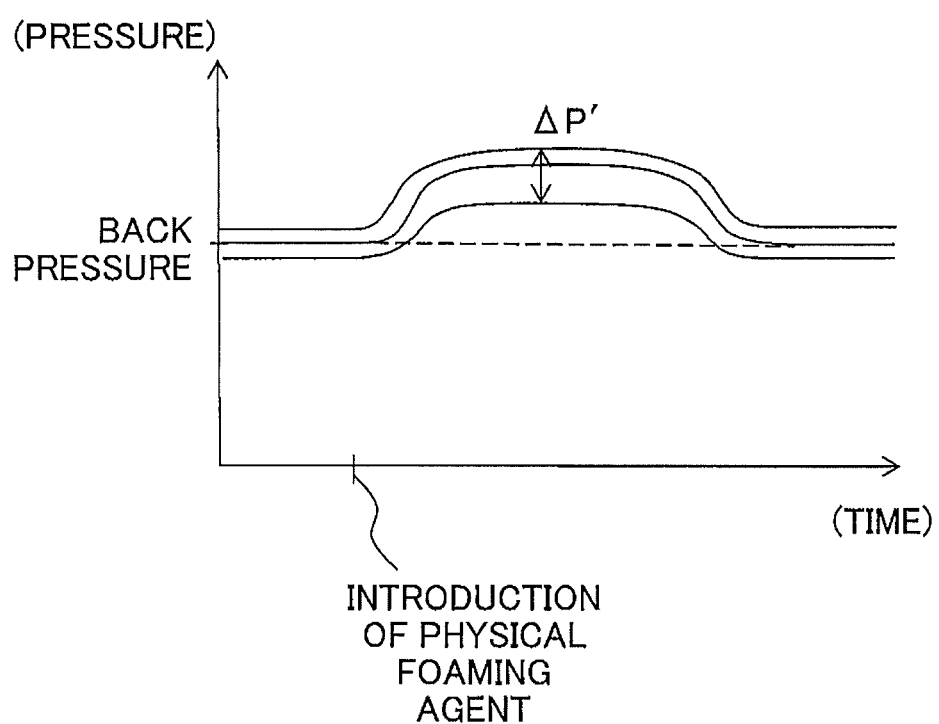
FIG. 12 shows the time-dependent change of the pressure in a high pressure kneading zone and a pressure reduction zone in a conventional plasticizing cylinder to be used for the foam injection molding.

As shown in FIG. 12, in the conventional technique, the amount of introduction of the physical foaming agent is weighed to introduce the physical foaming agent into the plasticizing cylinder, and the back pressure of the screw is raised to decrease the differential pressure with respect to the pressure of introduction of the physical foaming agent. However, the achieved pressure fluctuates for every shot. FIG. 12 shows the fluctuation of the achieved pressure by $\Delta P'$. It is presumed that FIG. 12 shows the fluctuation in every shot of the amount of the physical foaming agent actually introduced into the plasticizing cylinder, because the resin density and the pressure are fluctuated in the plasticizing cylinder on the receiving side.

In this embodiment, the pressure in the pressure reduction zone 23, which is provided when the communication between the high pressure kneading zone 22 and the pressure reduction zone 23 is shut off, is controlled by the pressure reduction zone pressure adjusting mechanism 219 so that the pressure is not less than the atmospheric pressure and the pressure is not more than the maximum pressure of the high pressure kneading zone 22 which is achieved when the physical foaming agent is brought in contact and kneaded with the molten resin. The pressure reduction zone pressure adjusting mechanism 219 can directly control the pressure in the pressure reduction zone 23. Therefore, the pressure kneading zone 22 before the pressure increase can be also controlled to have the same pressure. In other words, the pressure reduction zone pressure adjusting mechanism 219 controls the high pressure kneading zone 22 and the pressure reduction zone 23 to have the constant pressure when the high pressure kneading zone 22 and the pressure reduction zone 23 are communicated with each other. The control is performed with the pressure of the gas having the viscosity which is extremely lower than that of resin as provided in the conventional molten state. Therefore, the pressure at the communication portion can be instantaneously controlled to be constant. The pressure of the high pressure kneading zone 22 can be made constant, and it is possible to suppress the fluctuation of the differential pressure when the physical foaming agent is introduced. As a result, as shown in FIG. 8, the achieved pressure in every shot, i.e., the amount of introduction of the physical foaming agent can be made approximately constant.

It is necessary that the resin density should not be excessively increased in order that the pressures of the high pressure kneading zone 22 and the pressure reduction zone 23 are identical with each other during the communication. For example, if the flow resistance of the molten resin is large in the high pressure kneading zone 22 and the resin density is excessively raised, for example, on account of the shallow depth of the flight (groove) of the screw, then the easiness of passage of the gas is inhibited at the communication portion. For this reason, the pressure of the high pressure kneading zone 22 becomes higher than the gas pressure of the pressure reduction zone 23 in some cases during the communication. Even in such a situation, the foam molding can be performed at a low pressure. However, in view of the stability of the pressure, it is desirable that the difference in the internal pressure between the high pressure kneading zone 23 and the pressure reduction zone 23 is suppressed to be within 2 MPa during the communication.

In this embodiment, the pressure of the molten resin brought in contact and kneaded with the physical foaming agent may be controlled while feeding the molten resin to the pressure reduction zone 23. Alternatively, the pressure of the molten resin may be controlled in a state in which the molten resin is allowed to stay in the high pressure kneading zone 22. That is, in this embodiment, the downstream side seal mechanism S2 is provided, which communicates and disconnects the high pressure kneading zone 22 and the pressure reduction zone 23 in accordance with the rotation state of the screw 20. Therefore, even if the molten resin is not fed to the pressure reduction zone 23, when the high pressure kneading zone 22 and the pressure reduction zone 23 are communicated with each other, then the resin internal pressure of the molten resin can be lowered in the state in which the molten resin is allowed to stay in the high pressure kneading zone 22. Accordingly, the concentration of the physical foaming agent in the molten resin can be allowed to approach the saturated solubility. When the pressure of the molten resin is lowered, then any excessive physical foaming agent can be gasified and separated from the molten resin thereby, and the surplus physical foaming agent, which has been separated, can be discharged to the outside of the screw 210 from the gas discharge port 11 via the vent 203 of the pressure reduction zone 23 communicated with the high pressure kneading zone 22.

Further, in this embodiment, the physical foaming agent can be repeatedly brought in contact and kneaded and the physical foaming agent can be repeatedly separated from the molten resin in the state in which the molten resin is allowed to stay in the high pressure kneading zone 22. For example, the communication and the disconnection are repeated between the high pressure kneading zone 22 and the pressure reduction zone 23. When the communication between the high pressure kneading zone 22 and the pressure reduction zone 23 is shut off, the physical foaming agent is introduced into the molten resin. When the high pressure kneading zone 22 and the pressure reduction zone 23 are communicated with each other, the physical foaming agent is separated from the molten resin. In order to repeat the communication and the disconnection between the high pressure kneading zone 22 and the pressure reduction zone 23, for example, the forward rotation and the reverse rotation of the screw 20 may be repeated bit by bit. Alternatively, it is also allowable to repeat, bit by bit, the reverse rotation of the screw 20 at a number of revolutions of not less than a predetermined number of revolutions and the stop of the rotation of the screw 20 or the decrease in the number of revolutions of the reverse rotation of the screw 20. The physical foaming agent in an excessive amount can be also dissolved continuously while applying the screw shearing, while increasing/decreasing the pressure of the high pressure kneading zone 22 by repeating the communication and the disconnection between the high pressure kneading zone 22 and the pressure reduction zone 23 while continuously introducing the physical foaming agent.

In this embodiment, in order to suppress the vent up of the molten resin, the temperature of the pressure reduction zone 23 is controlled to be lower than those of the other zones in the same manner as in the first embodiment, wherein the viscosity of the molten resin is raised and the molten resin is in a semi-solidified state. The resin in the semi-solidified state is wound around the entire outer circumference of the flat portion 20B of the screw 20 in the same manner as in the first embodiment. Further, the resin is extruded by the molten resin disposed therebehind, and the resin is moved to the remelting zone 24 disposed on the downstream.

Subsequently, the molten resin, for which the pressure is controlled as described above, is foamed and molded into a desired shape (Step S14). In this embodiment, the resin in the semi-solidified state is heated and remelted in the remelting zone 24, and the resin is plasticized and weighed. After completing the plasticization and weighing, the screw 20 is moved frontwardly by means of moving means connected to the back end portion of the plasticizing cylinder 210, and the molten resin is injected and charged into a mold having a predetermined internal shape. The molten resin containing the physical foaming agent can be subjected to the sudden pressure reduction to produce a molded product (foamed molded product) formed with foamed cells. In this embodiment, the molten resin is injected from the forward end portion of the plasticizing cylinder 210 into a cavity 253 of the clamping unit 250. The mold is slightly opened (core back) without applying the pressure keeping to complete the molded product.

The present teaching will be explained more specifically below on the basis of Examples. However, the present teaching is not limited to Examples.

The kneading apparatus according to the aspect of the present teaching is provided with the pressure reduction zone pressure adjusting mechanism. The pressure of the pressure reduction zone is controlled by the pressure reduction zone pressure adjusting mechanism so that the pressure is not less than the atmospheric pressure and the pressure is not more than the maximum pressure of the high pressure kneading zone which is achieved or reached when the pressurized fluid is brought in contact and kneaded with the molten resin. Accordingly, the amount of the pressurized fluid introduced into the plasticizing cylinder can be stably controlled for each shot. Further, the kneading apparatus according to the aspect of the present teaching makes it possible to suppress the vent up of the molten resin. When the pressurized fluid is used as the physical foaming agent, the pressure of the molten resin brought in contact and kneaded with the physical foaming agent is controlled by adjusting the pressure of the atmosphere of the molten resin so that the pressure is not more than the maximum pressure which is achieved when the physical foaming agent is brought in contact and kneaded, before the injection and charging into the mold. Thus, the concentration of the physical foaming agent in the molten resin can be allowed to approach the saturated solubility.

EXAMPLES

Example 1

In Example 1, a thermoplastic resin molded product, in which a functional material was dispersed, was produced by means of the injection molding by using a molding machine 1000 provided with a kneading apparatus 200 shown in FIG. 1. Pressurized carbon dioxide was used as the pressurized fluid. Nylon 6 containing glass fiber by 30% was used as the thermoplastic resin, hexafluoroacetylacetona palladium (II) as an organic metal complex was used as the functional material, and perfluoropentylamine as a fluorine-based organic solvent was used as the solvent for dissolving the functional material. The amount of introduction of the mixture pressurized fluid was adjusted so that the concentration of carbon dioxide was about 2.5 wt % and the concentration of the organic metal complex was about 100 ppm with respect to the molten resin of each one shot.

<Molding Machine>

As described above, the molding machine 1000 shown in FIG. 1 is provided with the pressurized fluid supply apparatus 100, the kneading apparatus 200, the clamping unit 250, and the control unit (not shown) which controls the operations of the pressurized fluid supply apparatus 100, the kneading apparatus 200, and the clamping unit 250. The pressurized fluid supply apparatus 100 mixes pressurized carbon dioxide and a solution C obtained by dissolving the functional material in the solvent to prepare a mixture pressurized fluid, and the prepared mixture pressurized fluid is supplied to the plasticizing cylinder 210. A shutoff valve 36, which is opened/closed in accordance with the driving of the air cylinder 12, is provided at the nozzle forward end 29 of the kneading apparatus 200. The interior of the plasticizing cylinder 210 can be retained at a high pressure. A mold is brought in tight contact with the nozzle forward end 29. The molten resin is injected and charged from the nozzle forward end 29 into a cavity 253 formed by the mold.

The pressurized fluid supply apparatus 100 is arbitrary, provided that the pressurized fluid supply apparatus 100 is such a mechanism that the functional material is dissolved or dispersed in pressurized carbon dioxide to be introduced into the plasticizing cylinder 210. However, in this embodiment, the supply apparatus is used, which is provided with a syringe pump such as a syringe or injector for sucking, for example, pressurized carbon dioxide and performing liquid feeding. The pressurized fluid supply apparatus 100 of this embodiment is the apparatus which mixes and supplies pressurized carbon dioxide and the functional material. The pressurized fluid supply apparatus 100 is constructed by a syringe pump 102 for carbon dioxide which sucks liquid carbon dioxide from a carbon dioxide bomb 101 of the siphon type and which thereafter pressurizes and supplies liquid carbon dioxide, and a syringe pump 112 for the solution which pressurizes and supplies the functional material-containing liquid C. The respective syringe pumps 102, 112 can be subjected to the pressure control and the flow rate control. An air operate valve for suction 104 and an air operate valve for supply 105 are arranged for a piping for connecting the liquid carbon dioxide bomb 101 and the syringe pump 102 for carbon dioxide and a piping for connecting the syringe pump 102 for carbon dioxide and the plasticizing cylinder 210 respectively. Further, an air operate valve for suction 114 and an air operate valve for supply 115 are arranged for a piping for connecting a solution tank 111 and the syringe pump 112 for the solution and a piping for connecting the syringe pump 112 for the solution and the plasticizing cylinder 210 respectively.

<Molding Method>

At first, the air operate valve for suction 104 is opened, and liquid carbon dioxide is sucked from the liquid carbon dioxide bomb 101. Subsequently, liquid carbon dioxide is pressurized to arrive at a predetermined pressure in accordance with the pressure control of the syringe pump 102 for carbon dioxide. In Example 1, the head of the syringe pump 102 for carbon dioxide and the intermediate passage were cooled to 10° C., and pressurized carbon dioxide having a pressure of 10 MPa and a temperature of 10° C. was prepared.

Further, the air operate valve for suction 114, which is disposed on the side of the syringe pump 112 for the solution, is opened to suck the solution C containing the functional material dissolved in the solvent from the solution tank 111 via a filter 113 at ordinary temperature, and the solution C is pressurized to arrive at a predetermined pressure in accordance with the pressure control of the syringe pump 112 for the solution. In Example 1, the solution C was pressurized to 10 MPa.

Subsequently, the air operate valves for supply 105, 115 are opened, and then the syringe pump 102 for carbon dioxide and the syringe pump 112 for the solution are switched from the pressure control to the flow rate control. Pressurized carbon dioxide and the pressurized solution C are allowed to flow so as to provide a predetermined flow rate ratio. Accordingly, pressurized carbon dioxide and the solution C are mixed in the piping. Further, the interior of the system, which ranges to the introducing valve 212 for introducing the mixture pressurized fluid into the plasticizing cylinder 210, is pressurized. In Example 1, the supply volume ratio between pressurized carbon dioxide and the solution C was set to 5:1. When the mixture pressurized fluid, in which the volume ratio between pressurized carbon dioxide and the solution C is within a certain range (1:1 to 10:1), is used, then the thermal decomposition of the organic metal complex can be avoided by pressurized carbon dioxide in the kneading step, and pressurized carbon dioxide can be allowed to function as the compatibility-providing agent to assist the dispersion of the organic metal complex in the molten resin. In Example 1, the concentration of the functional material in the mixture pressurized fluid was controlled to be about 10 to 20% of the saturated solubility.

On the other hand, the thermoplastic resin was supplied from the resin supplying hipper 211 of the kneading apparatus 200, the plasticizing zone 21 was heated by means of the band heater (not shown) provided on the outer wall surface of the plasticizing zone 21, and the screw 20 was rotated frontwardly. Accordingly, the thermoplastic resin was heated and kneaded to provide the molten resin. In Example 1, the plasticizing zone 21 of the plasticizing cylinder 210 was heated so that the temperature of the molten resin was 210 to 240° C.

The molten resin was allowed to flow from the plasticizing zone 21 to the high pressure kneading zone 22 by rotating the screw 20 forwardly. The rotation of the screw 20 was once stopped at a position before arrival at the plasticization and weighing completion position by 20 mm (position on the mold side) in order to disconnect the high pressure kneading zone 22 from the pressure reduction zone 23 and the plasticizing zone 21, and then the screw 20 was reversely rotated (number of revolutions: 50 rpm). Accordingly, the upstream side and downstream side seal rings 40, 60 were moved to the upstream side, and the tapered surfaces of the truncated cone portions 31, 51 were allowed to abut against the tapered surfaces of the tapered portions 42, 62. Further, the upstream side and downstream side seal rings 40, 60 were allowed to corotate together with the screw 20. Thus, the gaps G were closed between the inner circumferential surfaces of the upstream side and downstream side seal rings 40, 60 and the outer circumferential surfaces of the screw 20, and the high pressure kneading zone 22 was disconnected from the pressure reduction zone 23 and the plasticizing zone 21.

As shown in FIG. 1, the introducing valve 212 is provided at the introducing port 202 of the plasticizing cylinder 210 in order to introduce the pressurized fluid. The introducing valve 212 has a fluid supply port 218 which is disposed at the proximal end portion connected to the introducing port 202 of the plasticizing cylinder 210, and the introducing valve 212 has an introducing piston 217 which is disposed therein. Therefore, when the fluid supply port 218 is opened by the introducing piston 217, the mixture pressurized fluid is thereby introduced from the pressurized fluid supply apparatus 100 into the plasticizing cylinder 210 at an arbitrary timing. In Example 1, the mixture pressurized fluid was introduced by opening the fluid supply port 218 in conformity with the driving of the syringe pumps 102, 112 after sealing the high pressure kneading zone 22 by means of the upstream side and downstream side seal mechanisms S1, S2, and the mixture pressurized fluid was intermittently introduced for every shot in accordance with the flow rate control so that the mixture pressurized fluid was allowed to stay in the high pressure kneading zone 22 for 1 second. Thus, the molten resin and the mixture pressurized fluid were brought in contact and kneaded with each other. In Example 1, the mixture pressurized fluid, which had a pressure of 10 MPa and a temperature of 10° C., was introduced by 3.5 wt % for 1 shot (weight: 75 g) of the molded product.

The pressure in the plasticizing cylinder 210, which was monitored by a pressure sensor 25 provided just under the concerning introducing valve 212, was 2 MPa before the introduction of the mixture pressurized fluid. The pressure was raised to 9 MPa at the maximum after the introduction of the mixture pressurized fluid.

On the other hand, when the communication between the high pressure kneading zone 22 and the pressure reduction zone 23 was shut off by the downstream side seal mechanism S2, the pressure of the pressure reduction zone 23 was controlled to a constant pressure by means of the pressure reduction zone pressure adjusting mechanism 219 so that the pressure was not less than the atmospheric pressure and the pressure was not more than the maximum achieved pressure of the high pressure kneading zone 22. In Example 1, the back pressure valve was set to 2 MPa, and the pressure of the pressure reduction zone 23 was always controlled to 2 MPa. Before the start of the molding, pressurized nitrogen was introduced into the pressure reduction zone 23 by using the pressurizing mechanism 2. Accordingly, the pressure reduction zone was pressurized, and the vent up was suppressed. After the start of the molding, an unillustrated valve was closed, and only the gas discharge was performed by means of the function of the back pressure valve.

The mixture pressurized fluid, which was introduced into the high pressure kneading zone 22, was dispersed in a high pressure state in the molten resin in the high pressure kneading zone 22. After that, the screw 20 was rotated frontwardly (in the direction of rotation of the screw to perform the plasticization), or the number of revolutions of the reverse rotation of the screw 20 was reduced, and thus the high pressure kneading zone 22 and the pressure reduction zone 23 were communicated with each other. In Example 1, the number of revolutions of the reverse rotation of the screw 20 was lowered (number of revolutions: 30 rpm), and the upstream side and downstream side seal rings 40, 60 were returned to the original downstream side positions. The tapered surfaces of the truncated cone portions 31, 51 were separated from the tapered surfaces of the tapered portions 42, 62, the gaps G were opened between the inner circumferential surfaces of the upstream side and downstream side seal rings 40, 60 and the outer circumferential surface of the screw 20, and the high pressure kneading zone 22 and the pressure reduction zone 23 were communicated with each other. Subsequently, the screw 20 was returned to perform the forward rotation, and the molten resin was allowed to flow to the pressure reduction zone 23.

As for the molten resin and the mixture pressurized fluid allowed to flow to the pressure reduction zone 23, the pressure was lowered to 2 MPa as the preset pressure of the pressure reduction zone. Accordingly, any surplus pressurized carbon dioxide was gasified and separated from the molten resin, and then surplus pressurized carbon dioxide was discharged from the gas discharge port 11 of the pressure reduction zone pressure adjusting mechanism 219 via the vent 203 of the plasticizing cylinder 210.

In Example 1, the pressure reduction zone 23 was cooled by the cooling jacket, and the pressure reduction zone 23 was controlled to the temperature lower by 50° C. than those of the other zones. Specifically, the pressure reduction zone was at 190° C., the kneading zone was at 240° C., and the remelting zone was at 240° C. Accordingly, the molten resin had a high viscosity in the pressure reduction zone 23, and the vent up from the vent 203 was not caused. If a plasticizing screw, which was not provided with the mechanism such as the cooling jacket or the like for controlling the temperature of the pressure reduction zone 23 to the temperature lower than those of the other zones, was used, then it was impossible to allow the temperature of the pressure reduction zone 23 to be not more than 210° C., and the vent up of the molten resin was caused.

Further, in Example 1, when carbon dioxide was discharged, the flat portion 20B of the screw 20, which had no flight, was positioned in the pressure reduction zone 23. Therefore, even in the case of the cooled molten resin having a high viscosity, the molten resin was successfully allowed to flow efficiently to the remelting zone 24 disposed on the downstream.

Subsequently, the molten resin was heated and remelted in the remelting zone 24 set to 240° C. After that, the molten resin was fed to the forward end portion of the plasticizing cylinder 210 by means of the first flight portion 20A of the screw 20 to complete the plasticization and weighing. After that, the shutoff valve 36 was opened, and the molten resin was injected and charged into the cavity 253. The pressure keeping was applied to the mold, and the molded product was completed.

The injection molding was continuously performed for the molded products as explained above for 100 shots, and 100 pieces of the molded products were obtained. The pressure fluctuation in the plasticizing cylinder was monitored for 100 shots by means of the pressure sensor 25 provided just under the introducing valve 212. As a result, the pressure before the introduction of the mixture pressurized fluid was constant, i.e., 2 MPa, and the maximum achieved pressure upon the introduction was 9±0.5 MPa as well, wherein any large fluctuation was not observed between the shots.

As for 100 pieces of the obtained molded products, all of 100 pieces were colored to be light brown, and no individual difference was observed in relation to the color tone of each of the molded products. According to this fact, it is presumed that the organic metal complex is introduced into each of the molded products, and there is no difference in the amount of the organic metal complex introduced into each of the molded products among the respective shots. Further, no foamed cell was observed at the inside of each of the molded products.

Further, in order to confirm the satisfactory dispersion of the organic metal complex in the obtained molded product, an electroless plating process was performed for the molded product. The electroless plating process was performed as follows. That is, the molded product was immersed for 10 minutes in an aqueous solution containing 1,3-butanediol by 75% by volume at 85° C. Subsequently, the molded product was immersed in an electroless nickel plating solution for 15 minutes at 85° C. The plating was applied to 100 pieces of the molded products. As a result, a plating film was formed on the entire surface in relation to all of 100 pieces of the molded products. Any defect such as the film missing of the plating film or the like was not caused.

Example 2

In Example 2, a molding machine 1000, which was provided with the same or equivalent kneading apparatus 200 as that of Example 1, was used to produce a thermioplastic resin molded product in which a functional material was dispersed, by means of the injection molding. In Example 2, the communication and the disconnection between the high pressure kneading zone 22 and the pressure reduction zone 23 were repeated a plurality of times in a state in which the molten resin was allowed to stay in the high pressure kneading zone 22. Pressurized carbon dioxide was used as the pressurized fluid in the same manner as in Example 1. Polypropylene was used as the thermoplastic resin, a silver complex, i.e., silver salt (I) of heptafluorobutyric acid as an antibacterial agent was used as the functional material, and ethanol was used as the solvent for dissolving the functional material. The amount of introduction of the mixture pressurized fluid was adjusted so that the concentration of carbon dioxide was 20 wt % and the concentration of the silver complex was 0.5 wt % with respect to the molten resin for each 1 shot.

At first, the mixture pressurized fluid was prepared by using the pressurized fluid supply apparatus 100, and the thermoplastic resin was plasticized and melted by using the kneading apparatus 200 in the same manner as in Example 1. The molten resin was allowed to flow to the high pressure kneading zone 22, and the screw 20 was once stopped in the same manner as in Example 1. After that, the screw 20 was reversely rotated to shut off the high pressure kneading zone 22 from the pressure reduction zone 23 and the plasticizing zone 21 by means of the upstream side and downstream side seal mechanisms S1, S2. Subsequently, the introducing valve 212 was opened, and the syringe pumps 102, 112 were driven to introduce pressurized carbon dioxide and the functional material into the high pressure kneading zone 22.

When the pressure in the plasticizing cylinder just under the introducing valve 212 arrives at 10 MPa, then the screw 20 was slightly rotated forwardly to communicate the high pressure kneading zone 22 and the pressure reduction zone 23, and the pressure of the high pressure kneading zone 22 was reduced to 6 MPa. The forward rotation and the reverse rotation of the screw 20 were repeated while continuously introducing the mixture pressurized fluid into the plasticizing cylinder 210 in accordance with the flow rate control. That is, the mixture pressurized fluid was continuously introduced into the plasticizing cylinder 210, while the communication and the disconnection between the high pressure kneading zone 22 and the pressure reduction zone 23 were repeated. A large amount of the mixture pressurized fluid was introduced into the plasticizing cylinder 210 while allowing the pressure of the high pressure kneading zone 22 to vary within a range from 6±1 MPa (minimum pressure during the forward rotation) to 10±1 MPa (maximum pressure during the reverse rotation). The period of time, which was required for each one operation of the forward rotation and the reverse rotation, was 1 s. The positions of the molten resin and the screw 20 were not moved.

On the other hand, the pressure in the cylinder in the pressure reduction zone 23 was controlled to 3±0.5 MPa by means of the pressure reduction zone pressure adjusting mechanism 219, and any surplus carbon dioxide and the solvent were discharged from the gas discharge port 11. The vent up of the molten resin from the vent 203 was not caused.

Subsequently, the screw 20 was returned to the forward rotation, and the molten resin was fed to the forward end portion of the screw 20 in the same manner as in Example 1 to complete the plasticizing and weighing so that the molten resin was injected and charged into the cavity 253 to obtain the molded product.

The injection molding was continuously performed for the molded products as explained above for 100 shots, and 100 pieces of the molded products were obtained. The pressure fluctuation in the plasticizing cylinder was monitored for 100 shots by means of the pressure sensor 25 provided just under the introducing valve 212. As a result, the pressure before the introduction of the mixture pressurized fluid was 3±0.5 MPa, and the maximum achieved pressure upon the introduction was 10±1 MPa as well, wherein any large fluctuation was not observed between the shots.

All of 100 pieces of the molded products obtained in Example 2 were colored to be dark (deep) yellow. The coloring was caused by the surface plasmon resonance of silver particles. According to this fact, it was successfully confirmed that the silver particles were introduced into the molded product, and the silver particles were converted into nanoparticles. Further, no individual difference was observed in relation to the color tone of each of the molded products. According to this fact, it is presumed that there is no difference in the amount of the silver particles introduced into each of the molded products among the respective shots. Further, no foamed cell was observed at the inside of each of the molded products. Further, the obtained molded product was used to evaluate the antibacterial performance in accordance with a standardized test method (JIS Z 2911) by using *Staphylococcus aureus* and *Escherichia coli*. As a result, it was confirmed that the molded product had a high antibacterial function and the antibacterial agent was satisfactorily dispersed in the molded product.

In Example 2, the molten resin and the mixture pressurized fluid were successfully brought in contact and kneaded with each other in the repeated manner while maintaining the appropriate pressure while suppressing any excessive increase in the pressure of the high pressure kneading zone 22 by repeating the communication and the disconnection between the high pressure kneading zone 22 and the pressure reduction zone 23 a plurality of times while introducing the mixture pressurized fluid into the plasticizing cylinder 210. When the high pressure kneading zone 22 and the pressure reduction zone 23 were communicated with each other, then a part of pressurized carbon dioxide in the high pressure kneading zone 22 was gasified thereby, and gasified carbon dioxide was successfully discharged from the pressure reduction zone 23. In this way, the functional material can be introduced into the molten resin at a high concentration by discharging carbon dioxide while introducing the mixture pressurized fluid into the plasticizing cylinder 210.

Example 3

In Example 3, a molded product (foamed molded product) having foamed cells was produced by means of the foam injection molding by raising the pressure of the pressure reduction zone 23 as compared with Example 1 by using a kneading apparatus 200 and a molding machine 1000 which were the same as or equivalent to those of Example 1.

Substances, which were the same as or equivalent to those of Example 1, were used as the pressurized fluid, the thermoplastic resin, the functional material, and the solvent respectively. The foam injection molding was performed in Example 3, and hence the pressurized fluid functioned as a physical foaming agent. The charging weight of the molten resin introduced into the mold was decreased by 30 wt % as compared with Example 1, and the amount of introduction of the mixture pressurized fluid with respect to the resin was equivalent to that in Example 1.

At first, the mixture pressurized fluid was prepared by using the pressurized fluid supply apparatus 100, and the thermoplastic resin was plasticized and melted by using the kneading apparatus 200 in the same manner as in Example 1. The molten resin was allowed to flow to the high pressure kneading zone 22, and the screw 20 was reversely rotated in the same manner as in Example 1 to shut off the high pressure kneading zone 22 from the pressure reduction zone 23 and the plasticizing zone 21 by means of the upstream side and downstream side seal mechanisms S1, S2. Subsequently, the mixture pressurized fluid was supplied to the high pressure kneading zone 22. The pressure of introduction of the mixture pressurized fluid was 15 MPa. The maximum achieved pressure, which was monitored by the pressure sensor 25 provided just under the introducing valve 212, was 13 MPa.

In Example 3, the metal complex as the functional material is exposed to a high temperature and kneaded, and thus the metal complex was decomposed and converted into nanoparticles. Specifically, the screw 20 was rotated for several seconds (5 s) at a low rotation speed (number of revolutions: 5 rpm) in the reverse rotation direction after introducing the pressurized mixture fluid. The screw was reversely rotated to such an extent that the resin density was not greatly changed as described above while maintaining the disconnected state between the high pressure kneading zone 22 and the pressure reduction zone 23. Thus, the metal complex was thermally decomposed at the high pressure to provide nanometal particles which were insoluble in pressurized carbon dioxide.

On the other hand, when the high pressure kneading zone 22 and the pressure reduction zone 23 are shut off by the downstream side seal mechanism S2, the pressure of the pressure reduction zone 23 was controlled to 10 MPa by means of the pressure reduction zone pressure adjusting mechanism 219.

Subsequently, the high pressure kneading zone 22 and the pressure reduction zone 23 were communicated with each other by means of the downstream side seal mechanism S2 in the same manner as in Example 1, and the molten resin, into which the mixture pressurized fluid was introduced, was allowed to flow to the pressure reduction zone 23 disposed on the downstream.

The molten resin and the mixture pressurized fluid, which were allowed to flow to the pressure reduction zone 23, were subjected to the pressure reduction in the same manner as in Example 1, and any surplus pressurized carbon dioxide was discharged from the gas discharge port 11. In this procedure, any vent up was not caused from the vent 203. In Example 3, the pressure of the pressure reduction zone was controlled to 10 MPa which was higher than that in Example 1. However, the metal complex as the functional material was changed to the metal particles which were insoluble in pressurized carbon dioxide. Therefore, the metal complex was not discharged together with gasified carbon dioxide. Further, the molten resin was fed to the remelting zone 24 disposed on the downstream in the same manner as in Example 1. After the completion of the plasticization and weighing, the molten resin was injected and charged into the cavity 253.

In Example 3, the molten resin was injected and charged into the cavity 253, and then the mold was opened by 0.5 mm (core back). Accordingly, the interior of the molded product was subjected to the sudden pressure reduction to obtain the foamed molded product having foamed cells.

The injection molding was continuously performed for the foamed molded products as explained above for 100 shots, and 100 pieces of the foamed molded products were obtained. The pressure fluctuation in the plasticizing cylinder was monitored for 100 shots by means of the pressure sensor 25 provided just under the introducing valve 212. As a result, the pressure before the introduction of the mixture pressurized fluid was constant, i.e., 10 MPa, and the maximum achieved pressure upon the introduction was 13±0.2 MPa as well, wherein any large fluctuation was not observed between the respective shots.

100 pieces of the obtained foamed molded products were colored to be light brown, and no individual difference was observed in relation to the color tone of each of the molded products. According to this fact, it can be presumed that the organic metal complex is introduced into each of the foamed molded products in the same manner as in Example 1, and there is no difference in the amount of the organic metal complex introduced into each of the foamed molded products among the respective shots in Example 3 as well.

Further, in order to confirm the satisfactory dispersion of the organic metal complex in the molded product, an electroless plating process was performed for the obtained foamed molded product in the same manner as in Example 1. The plating was applied to 100 pieces of the foamed molded products. As a result, a plating film was formed on the entire surface in relation to all of the foamed molded products. Any defect such as the film missing of the plating film or the like was not caused. Further, in Example 3, 20 μm of bright Cu electroplating and 20 μm of bright Ni electroplating were formed on the electroless plating film to obtain a plastic plating part. The obtained plastic plating part had a specific gravity of 0.9 which was light in weight. The appearance thereof had a texture (quality or feel of material) of metal equivalent to that of any decorative plating part. Further, a heat shock test was performed for the obtained plastic plating part. In Example 3, the process, in which the plastic plating part was alternately placed in environments at 90° C. and −35° C., was repeated for three cycles. As a result, any problem such as the film blister of the plating film or the like was not caused.

In Example 3, pressurized carbon dioxide, which serves as the physical foaming agent (foaming gas), is dispersed at the high pressure in the molten resin. Therefore, the physical foaming agent was successfully dispersed in the molten resin in a short period of time. Further, the pressure was reduced, and the surplus amount of carbon dioxide was discharged. Therefore, the amount of dissolution of pressurized carbon dioxide in the molten resin and the foamed state of the molded product were stabilized.

Comparative Example 1

In Comparative Example 1, a thermoplastic resin molded product, in which a functional material was dispersed, was produced by means of the injection molding by using a molding machine of the same form as that of Example 1 except that the kneading apparatus 200 did not have the pressure reduction zone pressure adjusting mechanism 219.

Therefore, in Comparative Example 1, the pressure of the pressure reduction zone 23 was not controlled, and carbon dioxide was discharged in a state approximately at the atmospheric pressure. Except for the above, the injection molding was continuously performed for 100 shots in accordance with the same or equivalent method as that used in Example 1.

The pressure fluctuation in the plasticizing cylinder was monitored for 100 shots by means of the pressure sensor 25 provided just under the introducing valve 212. As a result, the pressure before the introduction of the mixture pressurized fluid was constant, i.e., 0.1 MPa (atmospheric pressure), but the maximum achieved pressure upon the introduction of the mixture pressurized fluid was 6±2.5 MPa wherein the fluctuation was large between the respective shots, probably for the following reason. That is, the viscosity and the density of the molten resin were fluctuated for every shot, and hence it is estimated that the actual amount of introduction of the mixture pressurized fluid introduced from the introducing valve 212 was fluctuated. The maximum achieved pressure, which was provided upon the introduction of the mixture pressurized fluid, was lowered as compared with Example 1, and it was difficult to effectively permeate the functional material into the molten resin, probably for the following reason. That is, it is considered that the differential pressure between the pressure reduction zone 23 and the pressure of the mixture pressurized fluid introduced into the high pressure kneading zone 23 was increased as compared with Example 1.

100 pieces of the obtained molded products were colored to be light brown, and it was successfully confirmed that the organic metal complex was introduced into the respective foamed molded products. However, the color tone was changed between the shots of the molded products depending on the fluctuation of the maximum achieved pressure upon the introduction of the mixture pressurized fluid as described above. According to this fact, it is presumed that the amount of the organic metal complex introduced into each of the molded products is also fluctuated among the shots.

Further, the electroless plating was performed for 100 pieces of the obtained molded products in accordance with the same method as that used in Example 1. As a result, the film missing was observed for 5 pieces of 100 pieces of the molded products. It is presumed that the effective dispersion concentration of the organic metal complex in the molten resin was lowered on account of the decrease in the maximum achieved pressure upon the introduction of the mixture pressurized fluid as described above.

Example 4

In Example 4, a molded product (foamed molded product) having foamed cells was produced by means of the foam injection molding by using a molding machine 2000 shown in FIG. 10 as explained above. Nylon 6 containing glass fiber by 30% was used as the thermoplastic resin, and liquid carbon dioxide as the pressurized fluid having a pressure of 10 MPa at ordinary temperature (25° C.) was used as the physical foaming agent. In Example 4, the amount of introduction of the physical foaming agent was adjusted so that the concentration of the physical foaming agent was 2 wt % with respect to the molten resin for every 1 shot (100 g). The back pressure of the screw was set to 5.5 MPa. In Example 4, the functional material was not used.

At first, the air operate valve for suction 104 of the physical foaming agent supply apparatus 300 is opened to suck liquid carbon dioxide from the liquid carbon dioxide bomb 301. Subsequently, liquid carbon dioxide was pressurized to a predetermined pressure (10 MPa) in accordance with the pressure control of the syringe pump 102.

Subsequently, the air operate valve for supply 105 is opened, and then the syringe pump 102 is switched from the pressure control to the flow rate control to allow the physical foaming agent (liquid carbon dioxide) to flow. Accordingly, the interior of the system, which ranged to the introducing valve 212 for introducing the physical foaming agent into the plasticizing cylinder 210, was pressurized.

On the other hand, the thermoplastic resin was plasticized and melted by using the kneading apparatus 200 in the same manner as in Example 1. The molten resin was allowed to flow to the high pressure kneading zone 22. The screw 20 was once stopped and then the screw 20 was reversely rotated in the same manner as in Example 1. The high pressure kneading zone 22 was shut off from the pressure reduction zone 23 and the plasticizing zone 21 by means of the upstream side and downstream side seal mechanisms S1, S2. Subsequently, the fluid supply port 218 was opened in conformity with the driving of the syringe pump 102. The physical foaming agent was introduced intermittently for every shot in accordance with the flow rate control so that the physical foaming agent stayed for 1 second in the high pressure kneading zone 22. The molten resin and the physical foaming agent were brought in contact and kneaded with each other.

The pressure in the plasticizing cylinder 210, which was monitored by the pressure sensor 25 provided just under the concerning introducing valve 212, was 5 MPa before the introduction of the physical foaming agent. The pressure was raised to 8 MPa at the maximum after the introduction of the physical foaming agent.

On the other hand, when the communication between the high pressure kneading zone 22 and the pressure reduction zone 23 is shut off by the downstream side seal mechanism S2, the pressure of the pressure reduction zone 23 was controlled to a constant pressure by means of the pressure reduction zone pressure adjusting mechanism 219 so that the pressure was not less than the atmospheric pressure and the pressure was not more than the maximum achieved pressure of the high pressure kneading zone 22. In Example 4, the back pressure valve was set to 5 MPa, and the pressure of the pressure reduction zone 23 was always controlled to 5 MPa by means of the gas pressure. Before the start of the molding, pressurized nitrogen was introduced into the pressure reduction zone 23 by using the pressurizing mechanism 2. Accordingly, the pressure reduction zone was pressurized, and the vent up was suppressed. After the start of the molding, the unillustrated valve was closed, and only the gas discharge was performed by means of the function of the back pressure valve.

The physical foaming agent, which was introduced into the high pressure kneading zone 22, was dispersed in a high pressure state in the molten resin in the high pressure kneading zone 22. After that, the high pressure kneading zone 22 and the pressure reduction zone 23 were communicated with each other by means of the downstream side seal mechanism S2 in the same manner as in Example 1. The molten resin, into which the physical foaming agent was introduced, was allowed to flow to the pressure reduction zone 23 disposed on the downstream. In Example 4, the number of revolutions of the reverse rotation of the screw 20 was lowered (number of revolutions: 10 rpm) to communicate the high pressure kneading zone 22 and the pressure reduction zone 23. After that, the screw 20 was returned to the forward rotation, and the molten resin was allowed to flow to the pressure reduction zone 23.

As for the molten resin and the physical foaming agent allowed to flow to the pressure reduction zone 23, the pressure was lowered to 5 MPa as the preset pressure of the pressure reduction zone. Accordingly, any surplus pressurized carbon dioxide was gasified and separated from the molten resin, and then surplus pressurized carbon dioxide was discharged from the gas discharge port 11 of the pressure reduction zone pressure adjusting mechanism 219 via the vent 203 of the plasticizing cylinder 210. It is presumed that the concentration of the physical foaming agent in the molten resin approaches the saturated solubility in accordance with the control of the pressure of the atmosphere of the molten resin as described above.

In Example 4, the pressure reduction zone 23 was cooled by the cooling jacket in the same manner as in Example 1, and the pressure reduction zone 23 was controlled to the temperature lower by 50° C. than those of the other zones. Specifically, the pressure reduction zone was at 190° C., the kneading zone was at 240° C., and the remelting zone was at 240° C. Accordingly, the molten resin had a high viscosity in the pressure reduction zone 23, and the vent up from the vent 203 was not caused. If a plasticizing screw, which is not provided with the mechanism such as the cooling jacket or the like for controlling the temperature of the pressure reduction zone 23 to the temperature lower than those of the other zones, is used, then it was impossible to allow the temperature of the pressure reduction zone 23 to be not more than 210° C., and the vent up of the molten resin was caused.

Further, in Example 4, when the physical foaming agent was discharged, the flat portion 20B of the screw 20, which had no flight, was positioned at the pressure reduction zone 23. Therefore, even in the case of the cooled molten resin having a high viscosity, the molten resin was successfully allowed to flow efficiently to the remelting zone 24 disposed on the downstream.

Subsequently, the molten resin was heated and remelted in the remelting zone 24 set to 240° C. After that, the molten resin was fed to the forward end portion of the plasticizing cylinder 210 by means of the first flight portion 20A of the screw 20 to complete the plasticization and weighing. After that, the shutoff valve 36 was opened, and the molten resin was injected and charged into the cavity 253. The mold was opened by 0.5 mm (core back) without applying the pressure keeping to thereby suddenly reduce the pressure in the molten resin. The foamed cells were formed, and the foamed molded product was completed.

The foam injection molding as explained above was continuously performed for 100 shots, and 100 pieces of the foamed molded products were obtained. The pressure fluctuation in the plasticizing cylinder was monitored for 100 shots by means of the pressure sensor 25 provided just under the introducing valve 212. As a result, the pressure before the introduction of the physical foaming agent was constant, i.e., 5 MPa, and the maximum achieved pressure upon the introduction was 8±0.3 MPa as well, wherein any large fluctuation was not observed between the shots.

The obtained molded product had the specific gravity which was lighter by 14% than that of the solid (non-foamed molded product). The average cell diameter of the portion of the foamed molded product, which was positioned in the vicinity of the gate of the mold during the injection molding, was about 30 µm, and the density of the foamed cells was high as well. As a result of the confirmation of 100 pieces of the obtained molded products, the dispersion of weight was about 0.10% which was small. If an excessive amount of the physical foaming agent is introduced, and the physical foaming agent is separated in the plasticizing cylinder, then the surface of the molded product blisters. However, in Example 4, any molded product, which had any blister generated or formed on the surface, was absent. According to this fact, it is presumed that the separation was not caused between the molten resin and the physical foaming agent in the plasticizing cylinder.

In Example 4, pressurized carbon dioxide as the physical foaming agent was dispersed at the high pressure in the molten resin. Therefore, the physical foaming agent was successfully dispersed in the molten resin in a short period of time. Further, any surplus amount was thereafter discharged by reducing the pressure of the molten resin containing the physical foaming agent, and the pressure of the molten resin brought in contact and kneaded with the physical foaming agent was controlled so that the concentration of the physical foaming agent in the molten resin approached the saturated solubility. Accordingly, the amount of dissolution of the physical foaming agent and the foamed state of the molded product were stabilized.

Example 5

In Example 5, a molded product (foamed molded product) was produced by means of the foam injection molding by using the molding machine 2000 shown in FIG. 10 in the same manner as in Example 4. The thermoplastic resin and the physical foaming agent, which were the same as or equivalent to those of Example 4, were used. The amount of introduction of the physical foaming agent was adjusted so that the concentration of the physical foaming agent was 15 wt % which was the higher concentration as compared with Example 4, with respect to the molten resin for every 1 shot (100 g). In Example 5, the pressure of the pressure reduction zone 23 was set to 8 MPa which was higher than that in Example 4. The back pressure of the screw was set to 8.5 MPa. In Example 5, the functional material was not used.

At first, in the same manner as in Example 4, the physical foaming agent was prepared in the physical foaming agent supply apparatus 300, and the thermoplastic resin was plasticized and melted in the kneading apparatus 200. The molten resin was allowed to flow to the high pressure kneading zone 22. The screw 20 was once stopped and then the screw 20 was reversely rotated in the same manner as in Example 4. The high pressure kneading zone 22 was shut off from the pressure reduction zone 23 and the plasticizing zone 21 by means of the upstream side and downstream side seal mechanisms S1, S2. Subsequently, the introducing valve 212 was opened, the syringe pumps 102, 112 were driven, and the physical foaming agent was introduced into the high pressure kneading zone 22.

When the pressure in the plasticizing cylinder just under the introducing valve 212 arrives at 10 MPa, then the screw 20 was slightly rotated forwardly, and the high pressure kneading zone 22 and the pressure reduction zone 23 were communicated with each other so that the pressure of the high pressure kneading zone 22 was subjected to the pressure reduction to 8 MPa. The forward rotation and the reverse rotation of the screw 20 were repeated, while continuously introducing the physical foaming agent into the plasticizing cylinder 210 in accordance with the flow rate control. That is, the communication and the disconnection were repeated between the high pressure kneading zone 22 and the pressure reduction zone 23, while continuously introducing the physical foaming agent into the plasticizing cylinder 210. The physical foaming agent was newly supplied to the molten resin, while discharging the separated physical foaming agent from the molten resin by allowing the pressure of the high pressure kneading zone 22 to vary within a range from 8 MPa (minimum pressure during the forward rotation) to 10 MPa (maximum pressure during the reverse rotation). Accordingly, a large amount of the physical foaming agent was introduced into the molten resin. It is presumed that the concentration of the physical foaming agent in the molten resin approached the saturated solubility in accordance with the control of the pressure of the atmosphere of the molten resin and the introduction of the large amount of the physical foaming agent as described above. The period of time, which was required for each one operation of the forward rotation and the reverse rotation, was 1 s. The positions of the molten resin and the screw 20 were not moved.

On the other hand, the pressure in the cylinder in the pressure reduction zone 23 was controlled to 8 MPa by means of the pressure reduction zone pressure adjusting mechanism 219 during the period in which the forward rotation and the reverse rotation of the screw 20 were repeated, and any surplus physical foaming agent and the solvent were discharged from the gas discharge port 11. The vent up of the molten resin from the vent 203 was not caused.

Subsequently, the screw 20 was returned to the forward rotation, and the molten resin was fed to the forward end portion of the screw 20 in the same manner as in Example 4 to complete the plasticizing and weighing so that the molten resin was injected and charged into the cavity 253 to obtain the foamed molded product.

The foam injection molding was continuously performed as explained above for 100 shots, and 100 pieces of the molded products were obtained. The pressure fluctuation in the plasticizing cylinder was monitored for 100 shots by means of the pressure sensor 25 provided just under the introducing valve 212. As a result, the pressure before the introduction of the physical foaming agent was 8 MPa, and the maximum achieved pressure upon the introduction was 10±0.2 MPa as well, wherein any large fluctuation was not observed between the shots.

100 pieces of the molded products obtained in Example 5 had the specific gravity which was lighter by 35% than that of the solid (non-foamed molded product). The average cell diameter of the portion of the foamed molded product, which was positioned in the vicinity of the gate of the mold during the injection molding, was about 15 to 20 μm which was fine and minute, and the density of the foamed cells was high as well. As a result of the confirmation of 100 pieces of the obtained molded products, the dispersion of weight of the molded product was about 0.12% which was small. Further, in Example 5, any molded product, which had any blister generated or formed on the surface, was absent. According to this fact, it is presumed that the separation was not caused between the molten resin and the physical foaming agent in the plasticizing cylinder.

In Example 5, the molten resin and the physical foaming agent were successfully brought in contact and kneaded with each other in the repeated manner while maintaining the appropriate pressure while suppressing any excessive increase in the pressure of the high pressure kneading zone 22 by repeating the communication and the disconnection between the high pressure kneading zone 22 and the pressure reduction zone 23 while introducing the physical foaming agent into the plasticizing cylinder 210. Further, the high pressure kneading zone 22 and the pressure reduction zone 23 were communicated with each other, and thus a part of the physical foaming agent in the high pressure kneading zone 22 was gasified. The gasified physical foaming agent was successfully discharged from the pressure reduction zone 23. In this way, the physical foaming agent is discharged while introducing the physical foaming agent into the plasticizing cylinder 210. Accordingly, the concentration of the physical foaming agent in the molten resin can be efficiently allowed to approach the saturated solubility. Accordingly, the amount of dissolution of the physical foaming agent and the foamed state of the molded product were stabilized.

Example 6

Figure 11:
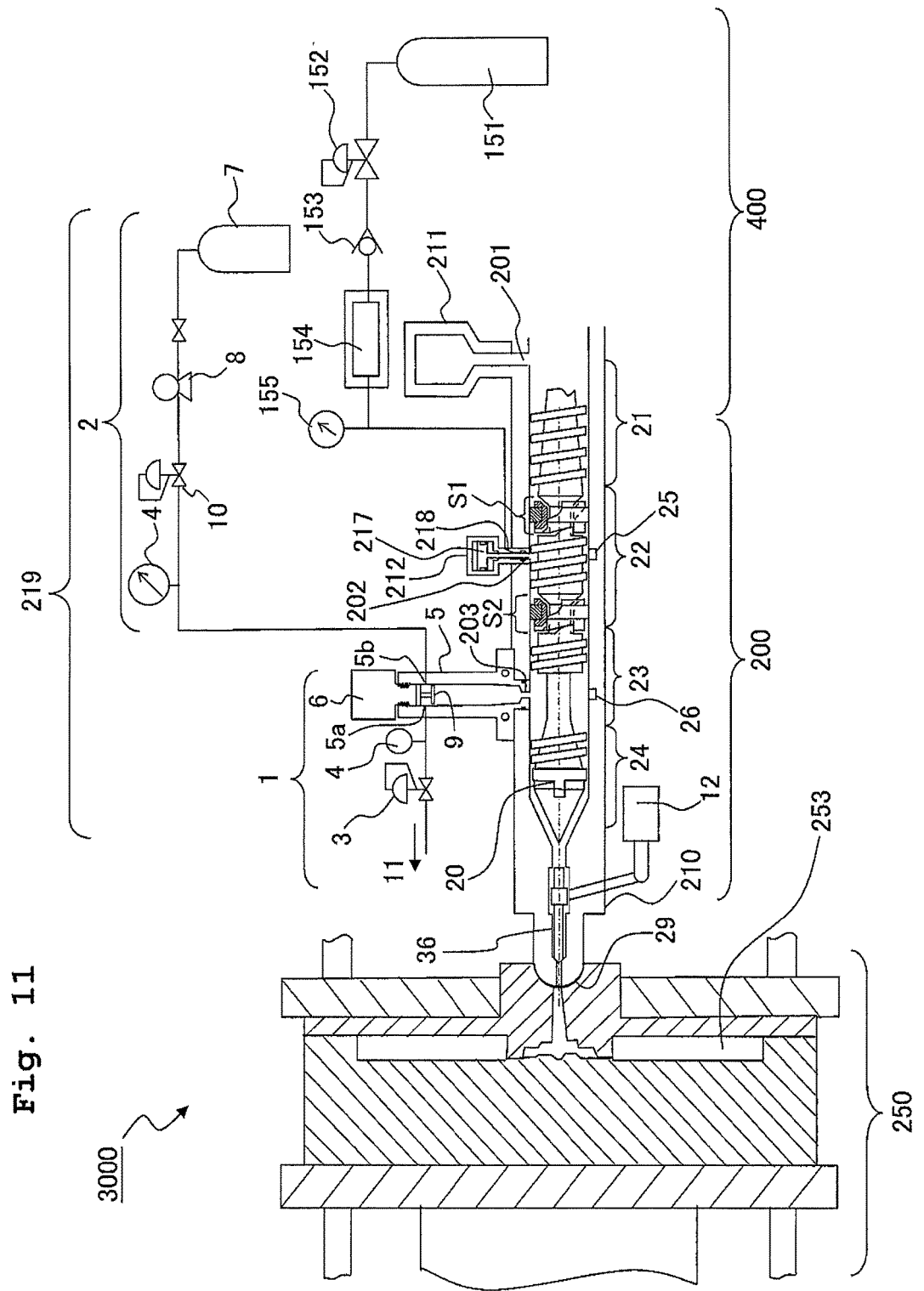
FIG. 11 shows a schematic sectional view illustrating another exemplary molding machine to carry out the foam injection molding method according to the second embodiment.

In Example 6, a molded product (foamed molded product) was produced by means of the foam injection molding by using a molding machine 3000 shown in FIG. 11. The molding machine 3000 is constructed in the same manner as the molding machine 2000 shown in FIG. 10 except that the physical foaming agent is supplied to the plasticizing cylinder 210 by using a physical foaming agent supply apparatus 400 having no syringe pump. In Example 6, pressurized nitrogen was used as the physical foaming agent, and the thermoplastic resin, which was the same as or equivalent to that used in Example 4, was used. In Example 6, the measurement of the amount of introduction of the physical foaming agent for the supply thereof to the plasticizing cylinder 210 were not performed. Further, in Example 6, the pressure of the pressure reduction zone 23 was 6 MPa. The back pressure of the screw was set to 6.5 MPa. In Example 6, the functional material was not used.

The physical foaming agent supply apparatus 400 is such an apparatus that nitrogen, which is contained in a nitrogen bomb 151 having an internal pressure of 14 MPa, is allowed to flow via a small-sized container 154 having a volume of 30 ml, and nitrogen is supplied from the introducing port 202 into the plasticizing screw 210. A pressure-reducing valve 152 and a check valve (non-return valve) 153 are provided between the nitrogen bomb 151 and the small-sized container 154. A pressure gauge 155 is provided between the small-sized container 154 and the introducing port 202.

In the physical foaming agent supply apparatus 400, the nitrogen gas in the nitrogen bomb 151 was stored in the small-sized container 154 via the check valve 153. In this procedure, the nitrogen gas was subjected to the pressure reduction by means of the pressure-reducing valve 152 so that the indication of the pressure gauge 155 was 10 MPa.

The thermoplastic resin was plasticized and melted by the kneading apparatus 200 in the same manner as in Example 4, and the molten resin was allowed to flow to the high pressure kneading zone 22. The screw 20 was rotated reversely in the same manner as in Example 4, and the high pressure kneading zone 22 was shut off from the pressure reduction zone 23 and the plasticizing zone 21 by means of the upstream side and downstream side seal mechanisms S1, S2. The screw 20 was stopped, and then the physical foaming agent was subsequently supplied to the high pressure kneading zone 22. In this procedure, the amount of introduction of the physical foaming agent was not weighed. The introducing valve 212 was closed in conformity with the timing at which the value of the pressure gauge 155 to indicate the pressure of the physical foaming agent in the small-sized container 154 was equal to the value of the pressure sensor 22 in the high pressure kneading zone 22, and the supply was stopped.

On the other hand, when the high pressure kneading zone 22 and the pressure reduction zone 23 are disconnected from each other by the downstream side seal mechanism S2, the pressure of the pressure reduction zone 23 was controlled to 6 MPa by means of the pressure reduction zone pressure adjusting mechanism 219.

Subsequently, the high pressure kneading zone 22 and the pressure reduction zone 23 were communicated with each other by the downstream side seal mechanism S2 in the same manner as in Example 4, and the molten resin, into which the physical foaming agent was introduced, was allowed to flow to the pressure reduction zone 23 disposed on the downstream.

The molten resin and the physical foaming agent, which were allowed to flow to the pressure reduction zone 23, were subjected to the pressure reduction in the same manner as in Example 4, and any surplus physical foaming agent was discharged from the gas discharge port 11. In this procedure, the vent up was not caused from the vent 203. It is presumed that the concentration of the physical foaming agent in the molten resin approached the saturated solubility in accordance with the control of the pressure of the atmosphere of the molten resin as described above. Further, the molten resin was fed to the remelting zone 24 disposed on the downstream in the same manner as in Example 4. After the completion of the plasticization and weighing, the molten resin was injected and charged into the cavity 253 to obtain the foamed molded product.

The foam injection molding was continuously performed as explained above for 100 shots, and 100 pieces of the molded products were obtained. The pressure fluctuation in the plasticizing cylinder was monitored for 100 shots by means of the pressure sensor 25 provided just under the introducing valve 212. As a result, the pressure before the introduction of the physical foaming agent was constant, i.e., 6 MPa, and the maximum achieved pressure upon the introduction was 8±0.2 MPa as well, wherein any large fluctuation was not observed between the shots.

100 pieces of the molded products obtained in Example 6 had the specific gravity which was lighter by 10% than that of the solid (non-foamed molded product). The average cell diameter of the portion of the foamed molded product, which was positioned in the vicinity of the gate of the mold during the injection molding, was about 10 to 20 µm which was fine and minute, and the density of the foamed cells was high as well. As a result of the confirmation of 100 pieces of the obtained molded products, the dispersion of weight of the molded product was about 0.11% which was small. Further, in Example 6, any molded product, which had any blister generated or formed on the surface, was absent. According to this fact, it is presumed that the separation was not caused between the molten resin and the physical foaming agent in the plasticizing cylinder.

In Example 6, the nitrogen gas in the nitrogen bomb 101 as the physical foaming agent was introduced into the plasticizing cylinder without being pressurized and without performing any strict flow rate control. In Example 6, the pressure of the molten resin brought in contact and kneaded with the physical foaming agent is controlled so that the concentration of the physical foaming agent in the molten resin approaches the saturated solubility before the injection. Therefore, it is unnecessary to strictly control the amount of introduction at the stage of introduction of the physical foaming agent into the plasticizing cylinder 210. Further, it is also unnecessary to provide a high pressure of the pressure of introduction. Therefore, it is unnecessary for the physical foaming agent supply apparatus 400 to have the flow rate control apparatus and the pressurizing apparatus, wherein it is possible to realize the low cost.

Comparative Example 2

In Comparative Example 2, a foamed molded product was produced in accordance with a foam injection molding method without controlling the pressure of the molten resin brought in contact and kneaded with the physical foaming agent. As for the molding machine, a molding machine was used, which had the same form as that of the molding machine 2000 used in Example 4 except that the molding machine had no pressure reduction zone pressure adjusting mechanism 219, the molding machine had no discharge port such as the vent 203 for discharging the surplus physical foaming agent, and the molding machine had an ordinary screw having the flight provided for the entire portion while having no flat portion 20B, in place of the screw 20. The thermoplastic resin, the physical foaming agent, and the amount of introduction of the physical foaming agent were the same as or equivalent to those of Example 4. However, in Comparative Example 2, the communication between the high pressure kneading zone 23 and the pressure reduction zone 22 was not shut off. Further, the pressure control of the pressure reduction zone 23 was not performed, and the discharge of the physical foaming agent from the plasticizing cylinder 21 was not performed as well. Further, the cooling of the pressure reduction zone was not performed as well, and the temperature control of the cooling zone was performed in the same manner as the other zones. In other words, the injection molding was performed in accordance with the same form as that of the conventional foam molding.

At first, in the same manner as in Example 4, the physical foaming agent was prepared in the physical foaming agent supply apparatus 300, and the thermoplastic resin was plasticized and melted in the kneading apparatus 200. The molten resin was allowed to flow to the high pressure kneading zone 22. In Comparative Example 2, the introducing valve 212 was opened while allowing the high pressure kneading zone 22 and the pressure reduction zone 23 to be communicated with each other. The syringe pump 102 was driven, and the physical foaming agent was introduced into the high pressure kneading zone 22. When 2 wt % of carbon dioxide as the physical foaming agent at a pressure of 10 MPa, which was under the same condition as that of Example 4, was introduced, the surface of the molded product was subjected to the foam breakage. This phenomenon was caused when the phase separation occurred with respect to the molten resin because the amount of introduction of the physical foaming agent was excessive. For this reason, the pressure of high pressure carbon dioxide was raised to 15 MPa, and the concentration of introduction was lowered to 0.4 wt %. During this process, the screw back pressure was 10 MPa.

After that, the screw 20 was rotated forwardly, and the molten resin was fed to the forward end portion of the plasticizing cylinder 210 to complete the plasticizing and weighing. The molten resin was injected and charged into the cavity 253 to obtain the foamed molded product in the same manner as in Example 4.

The foam injection molding was continuously performed as explained above for 100 shots, and 100 pieces of the foamed molded products were obtained. The pressure fluctuation in the plasticizing cylinder was monitored for 100 shots by means of the pressure sensor 25 provided just under the introducing valve 212. As a result, the maximum achieved pressure upon the introduction of the physical foaming agent was 11.0 to 114 MPa, wherein the large fluctuation was observed between the shots, probably for the following reason. That is, it is estimated that the actual amount of introduction of the physical foaming agent introduced from the introducing valve 212 was fluctuated, because the viscosity and the density of the molten resin and the internal pressure at the physical foaming agent introducing portion were fluctuated for every shot.

Further, 100 pieces of the molded products obtained in Comparative Example 2 had the specific gravity which was lighter by 8% than that of the solid (non-foamed molded product). However, the average cell diameter of the portion, which was positioned in the vicinity of the gate of the mold during the injection molding, was about 40 to 60 µm which was enlarged. It is presumed that the foaming density was lowered and the cell diameter was increased, because the concentration of introduction was low, although the pressure of introduction of the physical foaming agent was raised.

Further, as a result of the confirmation of 100 pieces of the obtained molded products, the dispersion of weight of the molded product was about 2.5% which was large. Further, the blisters appeared on the surfaces of 8 pieces of the foamed molded products of 100 pieces of the foamed molded products. According to this fact, it is presumed that the separation was caused between the molten resin and the physical foaming agent in the plasticizing cylinder during the formation of 8 pieces of the foamed molded products.

In Comparative Example 2, as described above, the amount of introduction of the physical foaming agent into the plasticizing cylinder 210 was unstable. This results from the fluctuation of the resin internal pressure at the introducing portion. When the resin internal pressure was low, and the amount of introduction of the physical foaming agent was temporarily increased, then the supply pressure of the physical foaming agent indicated by the pressure gauge 155 was suddenly lowered. The physical foaming agent was supplied at the constant flow rate by means of the syringe pump 102 for every shot, and the control based on the pressure was not performed. Therefore, when the supply pressure of the physical foaming agent was lowered, the maximum achieved pressure in the plasticizing cylinder 210 disposed on the side to be supplied was lowered. In Comparative Example 2, it is presumed that the physical foaming agent subjected to the phase separation cannot be dissolved in the molten resin again and any harmful influence is exerted on the molded product, because the amount of introduction of the physical foaming agent is fluctuated and a large amount of the physical foaming agent cannot be dissolved by the screw shearing performed for a short period of time.

The present teaching has been explained in detail above. The present teaching is summarized as follows according to the embodiments described above.

According to a first aspect of the present teaching, there is provided a kneading apparatus for a thermoplastic resin; including a plasticizing cylinder which has a high pressure kneading zone for kneading a molten resin obtained by plasticizing and melting the thermoplastic resin with a pressurized fluid, and a pressure reduction zone for discharging the gasified pressurized fluid from the molten resin kneaded with the pressurized fluid; a screw which is arranged rotatably and movably back and forth in the plasticizing cylinder; a downstream side seal mechanism which is provided between the high pressure kneading zone and the pressure reduction zone and which shuts off communication between the high pressure kneading zone and the pressure reduction zone; and a pressure reduction zone pressure adjusting mechanism which is connected to the pressure reduction zone of the plasticizing cylinder and which controls a pressure of the pressure reduction zone so that the pressure is not less than an atmospheric pressure and the pressure is not more than a maximum pressure of the high pressure kneading zone that is achieved when kneading the molten resin with the pressurized fluid, when the downstream side seal mechanism shuts off the communication between the high pressure kneading zone and the pressure reduction zone.

In the kneading apparatus for the thermoplastic resin described above, the pressure reduction zone pressure adjusting mechanism may have a back pressure valve. The pressure reduction zone pressure adjusting mechanism may have a pressurizing mechanism which pressurizes the pressure reduction zone and a gas discharge mechanism which discharges the gasified pressurized fluid from the pressure reduction zone. The pressure reduction zone pressure adjusting mechanism may control the high pressure kneading zone and the pressure reduction zone to have a constant pressure when the high pressure kneading zone and the pressure reduction zone are communicated with each other.

In the kneading apparatus for the thermoplastic resin described above, the screw may have first and second flight portions which have flights and a flat portion which is interposed between the first and second flight portions and which has no flight; and at least a part of the flat portion may be positioned in the pressure reduction zone when the gasified pressurized fluid is discharged. A cooling mechanism may be provided for the pressure reduction zone of the kneading apparatus. Further, the pressure reduction zone pressure adjusting mechanism may have a resin trap.

In the kneading apparatus for the thermoplastic resin described above, the pressurized fluid may be pressurized carbon dioxide, and a functional material may be further contained. The pressurized fluid may be a physical foaming agent.

According to a second aspect of the present teaching, there is provided a production method for producing a thermoplastic resin molded product including: providing a plasticizing cylinder which has a high pressure kneading zone for kneading a molten resin obtained by plasticizing a thermoplastic resin with a pressurized fluid, and a pressure reduction zone for discharging the gasified pressurized fluid from the molten resin kneaded with the pressurized fluid; plasticizing the thermoplastic resin to provide the molten resin; shutting off communication between the high pressure kneading zone and the pressure reduction zone; kneading the molten resin with the pressurized fluid in a state in which the communication between the high pressure kneading zone and the pressure reduction zone is shut off; controlling a pressure of the pressure reduction zone so that the pressure is not less than an atmospheric pressure and the pressure is not more than a maximum pressure of the high pressure kneading zone which is achieved when kneading the molten resin with the pressurized fluid, in the state in which the communication between the high pressure kneading zone and the pressure reduction zone is shut off; communicating the high pressure kneading zone and the pressure reduction zone; lowering a pressure of the molten resin kneaded with the pressurized fluid to separate the gasified pressurized fluid from the molten resin; and molding, into a desired shape, the molten resin from which the gasified pressurized fluid is separated.

In the production method for producing the thermoplastic resin molded product described above, the controlling of the pressure of the pressure reduction zone may include controlling a pressure of a gas in the pressure reduction zone. The controlling of the pressure of the pressure reduction zone may include introducing an inert gas into the pressure reduction zone to pressurize the pressure reduction zone and/or discharging the gasified pressurized fluid from the pressure reduction zone by using a back pressure valve.

When the gasified pressurized fluid is separated from the molten resin, a temperature of the pressure reduction zone may be controlled to be lower than a temperature of the high pressure kneading zone, while the pressure reduction zone may be cooled.

A process, in which the molten resin and the pressurized fluid are kneaded with each other and the gasified pressurized fluid is separated from the molten resin, may be repeated a plurality of times in a state in which the molten resin stays in the high pressure kneading zone. A process, in which the high pressure kneading zone and the pressure reduction zone are communicated and shut off, may be repeated a plurality of times.

In the production method for producing the thermoplastic resin molded product described above, the pressurized fluid may be pressurized carbon dioxide, and a functional material may be further contained. Further, the functional material may be a metal complex.

The pressurized fluid may be a physical foaming agent, and the molding of the molten resin into the desired shape may include foaming the molten resin. Further, the physical foaming agent, which is to be kneaded with the molten resin, may be supplied to the high pressure kneading zone without controlling a supply amount. The physical foaming agent may be pressurized nitrogen or pressurized carbon dioxide. A concentration of the physical foaming agent in the molten resin may approach a saturated solubility by separating the gasified physical foaming agent from the molten resin.

According to a third aspect of the present teaching, there is provided a foam injection molding method for a thermoplastic resin; including plasticizing the thermoplastic resin to provide a molten resin; kneading the molten resin with a physical foaming agent; controlling a pressure of the molten resin kneaded with the physical foaming agent to be not more than a maximum pressure which is achieved when kneading the molten resin with the physical foaming agent by adjusting a pressure of a gas existing around the molten resin so that a concentration of the physical foaming agent in the molten resin approaches a saturated solubility; and foaming and molding, into a desired shape, the molten resin of which the pressure is controlled.

In the foam injection molding method described above, the controlling of the pressure of the molten resin kneaded with the physical foaming agent may include separating the gasified physical foaming agent from the molten resin.

The present teaching has been explained above with reference to the embodiments and Examples. However, the present teaching is not limited to the embodiments and Examples described above. The construction and details of the present teaching can be variously changed as understandable by those skilled in the art within a scope of the present teaching.

According to the present teaching, the amount of the pressurized fluid introduced into the plasticizing cylinder can be stably controlled for every shot in the kneading apparatus in which the pressurized fluid is kneaded with the molten resin in the plasticizing cylinder and at least a part of the pressurized fluid is discharged. Further, the kneading apparatus of the present teaching makes it possible to suppress the vent up of the molten resin. Therefore, according to the present teaching, it is possible to industrially and stably produce the thermoplastic resin molded product.

What is claimed is:

1. A kneading apparatus for a thermoplastic resin, comprising:
   a plasticizing cylinder which has a high pressure kneading zone, and a pressure reduction zone;
   a screw which is arranged rotatably and movably back and forth in the plasticizing cylinder;
   a downstream side seal mechanism which is provided between the high pressure kneading zone and the pressure reduction zone; and
   a pressure reduction zone pressure adjusting mechanism which is connected to the pressure reduction zone of the plasticizing cylinder and which controls a pressure of the pressure reduction zone to a predetermined value.

2. The kneading apparatus according to claim 1, wherein the pressure reduction zone pressure adjusting mechanism has a back pressure valve.

3. The kneading apparatus according to claim 1, wherein the pressure reduction zone pressure adjusting mechanism has a pressurizing mechanism which pressurizes the pressure reduction zone and a gas discharge mechanism which discharges the gasified pressurized fluid from the pressure reduction zone.

4. The kneading apparatus according to claim 1, wherein the pressure reduction zone pressure adjusting mechanism controls the high pressure kneading zone and the pressure reduction zone to have a constant pressure when the high pressure kneading zone and the pressure reduction zone are communicated with each other.

5. The kneading apparatus according to claim 1, wherein a cooling mechanism is provided for the pressure reduction zone.

6. The kneading apparatus according to claim 1, wherein the downstream side seal mechanism shuts off the communication between the high pressure kneading zone and the pressure reduction zone in accordance with a rotation state of the screw.

7. The kneading apparatus according to claim 1, wherein the downstream side seal mechanism shuts off or disconnects the high pressure kneading zone and the pressure reduction zone in accordance with reverse rotation of the screw.

8. The kneading apparatus according to claim 1, wherein the downstream side seal mechanism communicates the high pressure kneading zone and the pressure reduction zone in accordance with any one of forward rotation of the screw, stop of rotation of the screw, and decrease in a number of revolutions of reverse rotation of the screw.

* * * * *